United States Patent [19]

Chuang

[11] 4,028,674
[45] June 7, 1977

[54] AUTOMATED SIGNATURE VERIFICATION SYSTEM

[75] Inventor: Ping-Chien Chuang, Irving, Tex.

[73] Assignee: Recognition Equipment Incorporated, Dallas, Tex.

[22] Filed: June 4, 1976

[21] Appl. No.: 692,768

[52] U.S. Cl. .................................. 340/146.3 SY
[51] Int. Cl.² ..................................... G06K 9/00
[58] Field of Search ......... 340/146.3 SY, 146.3 SG, 340/146.3 R

[56] References Cited
UNITED STATES PATENTS

| | | | |
|---|---|---|---|
| 3,111,646 | 11/1963 | Harmon | 340/146.3 SG |
| 3,133,266 | 5/1964 | Frishkopf | 340/146.3 SG |
| 3,699,517 | 10/1972 | Dyche | 340/146.3 SY |

*Primary Examiner*—Leo H. Boudreau
*Attorney, Agent, or Firm*—John E. Vandigriff

[57] ABSTRACT

Signature verification where an image mosaic for a signature to be verified is stored in a memory and wherein a prototype feature set for said signature is stored in memory. Binary signals representative of the location and magnitude of positive and negative peaks in mosaic and the stroke character in the region of each of said peaks are generated. A two-dimensional feature set patterned after the prototype set is stored with the signals ordered in dependence upon the occurrence of the peaks in the signature and accompanied by (i) peak rank in terms of peak magnitude and (ii) stroke character in the vicinity of each peak. The feature vector set is then compared with the prototype vector set and identity is signaled when within predetermined limits the feature set matches the prototype set.

16 Claims, 14 Drawing Figures

| PATTERN | IDENTITY | CODE |
|---|---|---|
|  | SIMPLE BAR | 1 |
|  | NORMAL CAP | 2 |
|  | EXTENDED CAP | 3 |
|  | HORIZONTAL BAR | 4 |
|  | CROSS BAR | 5 |
|  | LEFT ANGLE | 6 |
|  | RIGHT ANGLE | 7 |
| ALL OTHERS | — | 8 |
FIG. 5

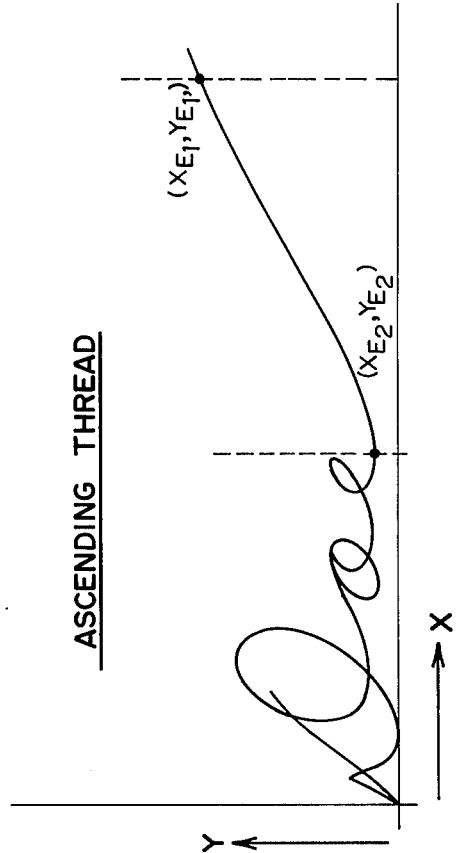
FIG. 8b ASCENDING THREAD
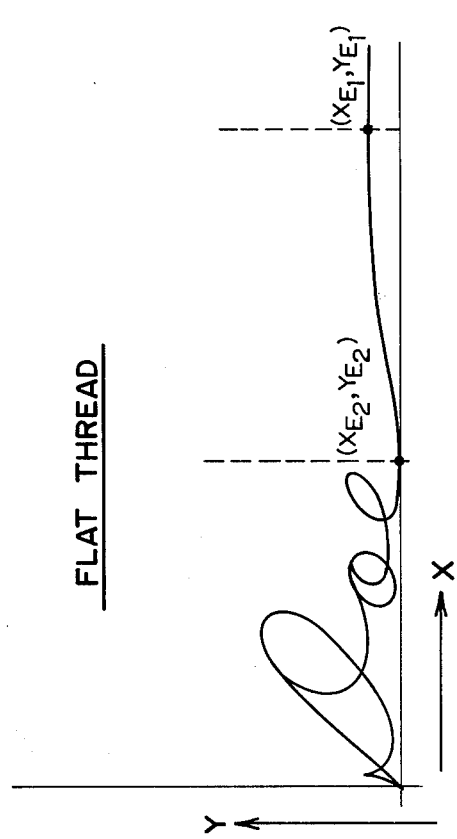
FIG. 8a FLAT THREAD
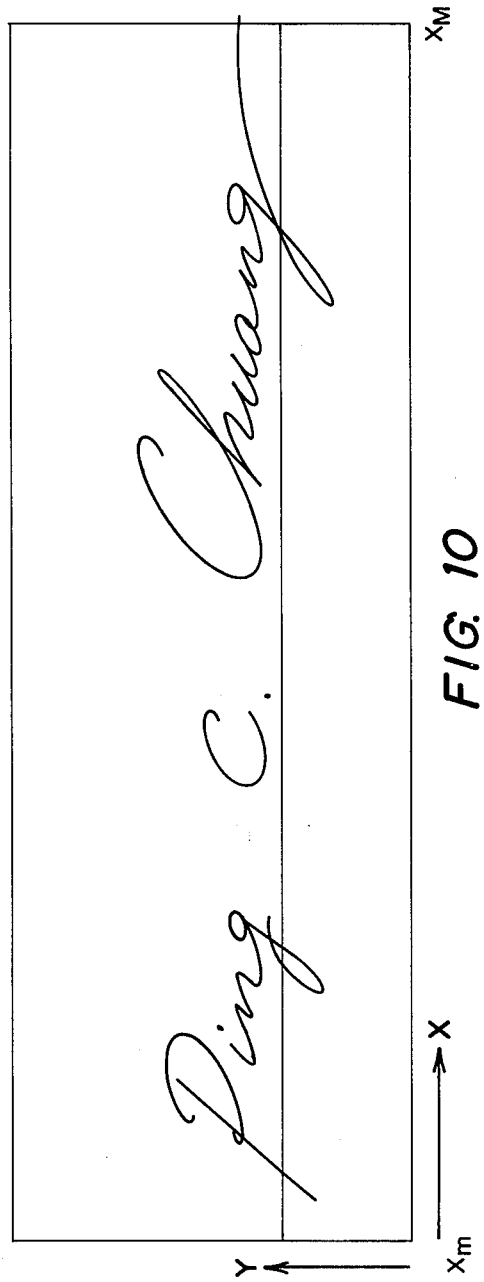
FIG. 10

AUTOMATED SIGNATURE VERIFICATION SYSTEM

FIELD OF THE INVENTION

The present invention relates generally to pattern recognition systems, and more particularly to an automated system for distinguishing between the handwritings of different authors at a time remote from the instant of signing.

PRIOR ART

Each year innumerable checks and credit card charges are written, with the majority of these transactions being authorized by signature. A need has long existed for an economical and rapid method of verifying such signatures.

In many banks the problem of signature verification is solved by rejecting all checks drawn on known suspect accounts and accepting all other checks. The rejected checks are then manually processed to verify the signatures. Such processing not only exposes the bank to unauthorized transactions against those accounts not suspected, but also incurs a needless waste in manpower utilization.

In order to accommodate the large volume of transactions occuring daily with the major commercial banks, a random sampling technique has been used with minimal success since there is an equal probability of selecting a check having an authentic signature as one having a fraudulent signature. Further, when the rate of fraudulent check transactions has become economically unbearable, such blanks have been forced to return to the totally manual process. The need for an automatic signature system having a high degree of reliability is apparent.

Fully automated signature verification systems may be classified into two broad categories: real time systems where the signature is signed in the presence of sensors sufficient to collect time information in addition to topological information; and systems dependent only on topological information which may operate a delayed time after the signature has been signed. Real time verification is the easier of the two processes since stroke sequence and timing information may complement the topographical data. The most successful of the real time verification processes utilizes time base information, and analyzes certain time and frequency characteristics of the muscular movement of the hand of the person making the signature. Since this process requires that the signature be sensed at the time of signing, however, it cannot be used where signatures are signed on financial transaction documents at a location remote from a check processing center.

A system for recognizing individual handwritten characters independent of time related information is described in U.S. Pat. No. 3,541,511 and in Genchi et al., *Recognition of Handwritten Numerical Characters for Automatic Letter Sorting*, 56 Proceedings Of The IEEE 8 (August 1968). The system requires the thinning of a character video image to an allowed width, and the derivation of stroke segment directions during a smoothing of the thinned image. Horizontal feature patterns and their vertical connective relationship are identified from horizontal strings of such stroke segment directions. The string of horizontal features then are matched against reference strings of features to identify the character in question. No capability is disclosed for distinguishing between the handwritings of different authors.

The present invention provides an automatic signature verification system which may operate in other than real time, and which is not dependent upon time related information. Rather, a signature in question is optically scanned, and a two-dimensional binary pattern of the signature is analyzed for shape and other geometrical characteristics identifiable with the handwriting style of the author.

SUMMARY OF THE INVENTION

The present invention is directed to an automated system for verifying authentic signatures and detecting invalid signatures handwritten on a document surface. More particularly, plural authorized signatures of an author are scanned, and the binary images formed thereby sensed to detect distinctive signature features including uppermost and lowermost signature peaks and a signature ending. The shapes of the signature in near proximity to the peaks are identified, and the peaks are ranked with respect to their vertical distance from a signature base line. Feature vector sets are formed from the detected features, and collected into clusters representative of an upper zone, a lower zone and the signature ending of the authorized signatures. Like components of the feature vector sets forming a cluster are averaged to provide a prototype vector set representative of the cluster. Weights are assigned to each component of each member of each such prototype vector set, and a decision threshold is determined for the upper zone, the lower zone and the signature ending. The prototype vector sets, the weights assigned thereto, and the decision thresholds form a reference data set for the authorized signatures.

Upon establishing a reference data set, an unauthenticated signature is processed in a like manner to form feature vector sets representative of the upper zone, the lower zone and the ending of the signature. Weighted sums of the differences between the feature vector sets of the unauthenticated signature and the reference prototype vector sets of the authorized signatures are compared to a corresponding reference decision threshold to identify the unauthenticated signature as valid or invalid.

DESCRIPTION OF THE DRAWINGS

For a more complete understanding of the present invention and for further objects and advantages thereof, reference may now be had to the following description taken in conjunction with the accompanying drawings in which:

FIG. 5 is a table of patterns used in the shape analysis of an upper zone of a signature image;

FIGS. 8A and 8B illustrate signature ending patterns;

FIG. 10 is an illustration of a Ping C. Chuang signature having a signature ending;

DESCRIPTION OF PREFERRED EMBODIMENTS

FIGURE 1

Figure 1:
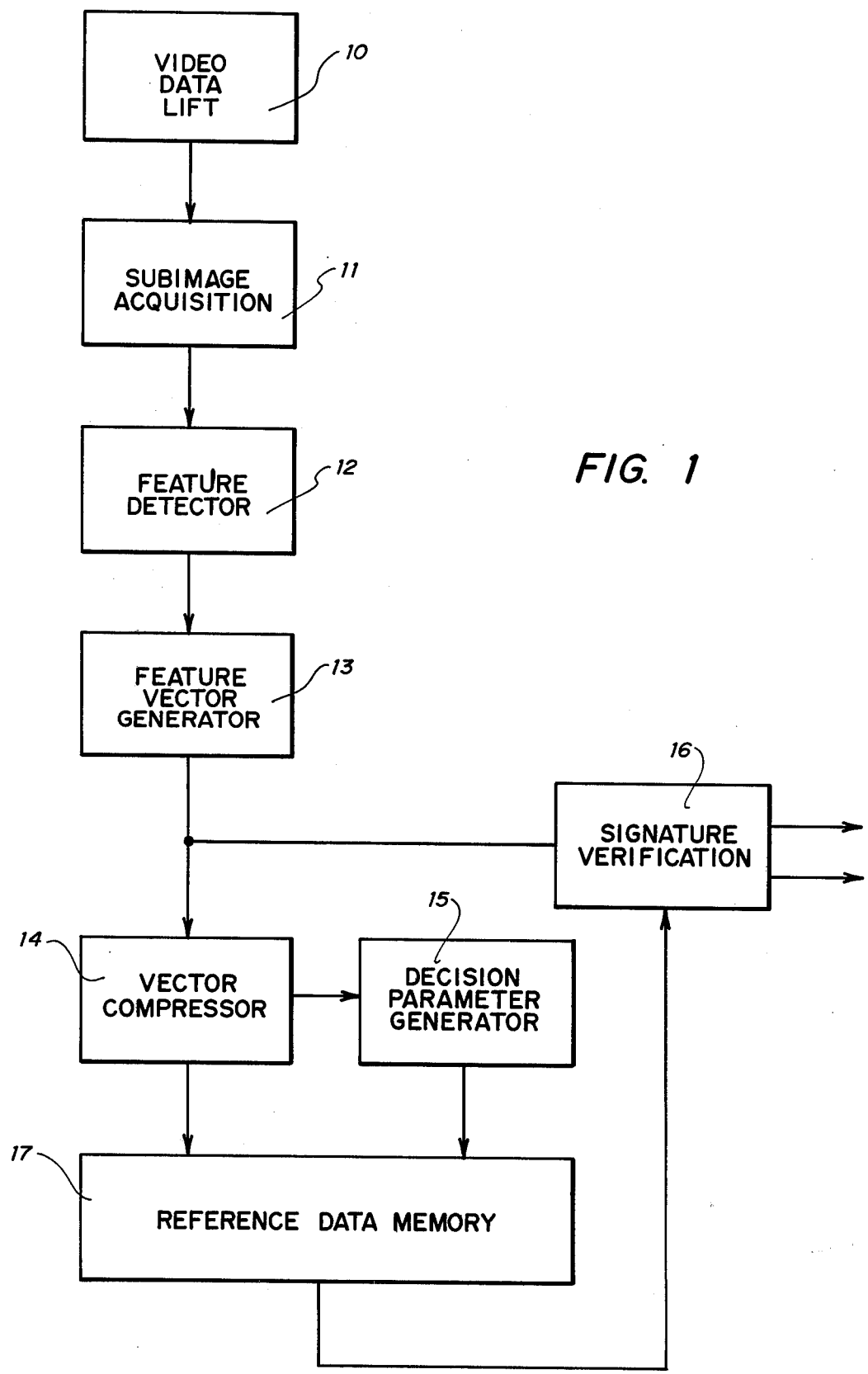
FIG. 1 is a functional block diagram of a signature verification system embodying the invention.

FIG. 1 illustrates in functional block diagram form a signature verification system embodying the invention.

A signature is scanned by a video data lift unit 10, and the video signal generated thereby is quantized by a subimage acquisition unit 11 to form a binary representation of the signature. In the preferred embodiment described herein, unit 10 is a self-scanned columnar photosensor array 128 sensor cells tall. The video response of each sensor of the array is converted by unit 11 to a four bit digital value indicative of one of sixteen brightness levels (0–15). For further processing of a signature formed on a contrasting background, a threshold "t" is set to distinguish between information and background video responses. Typically, "t" is set at three (3). If a brightness level of a sensor response is greater than three, then that response is represented by a logic one. Otherwise, the sensor response is represented by a logic zero. The bit density level of a digitized signature image is reduced thereby from a four to a one bit representation.

After the signature image has been reduced to a binary representation by subimage acquisition unit 11, signature features are detected by a feature detector unit 12. The detected features are forwarded to a feature vector generator 13 which generates feature vector sets representative of an upper zone, a lower zone and an ending of the signature image. The output of the generator 13 is connected to the inputs of a vector compressor unit 14 and a signature verification unit 16.

If the signature scanned is a known authorized signature, vector compressor unit 14 forms a prototype vector set representative of plural feature vector sets formed from plural samples of an authorized signature. A separate prototype vector set is formed for the upper zone, lower zone and ending of the signature image. A decision parameter generator 15 receives the prototype vector sets from compressor unit 14, and assigns a threshold to each prototype vector set and a weight to each component of each prototype vector set.

A reference data set comprising an upper zone subset, a lower zone subset and an ending subset is stored in a reference data memory unit 17. Each subset includes a prototype vector set, a threshold, and weights assigned to each component of the prototype vector set.

When an unauthenticated signature is scanned by unit 10, the above-described process is repeated through the generation of feature vector sets. Verification unit 16 then compares the feature vector sets of the unauthenticated signature with the prototype vector sets of an authorized signature stored in memory unit 17. More particularly, weighted sum deviations between the signatures for the upper and lower zones and the signature ending are determined, and such deviations are compared to an associated threshold for a validity determination.

Figure 2:
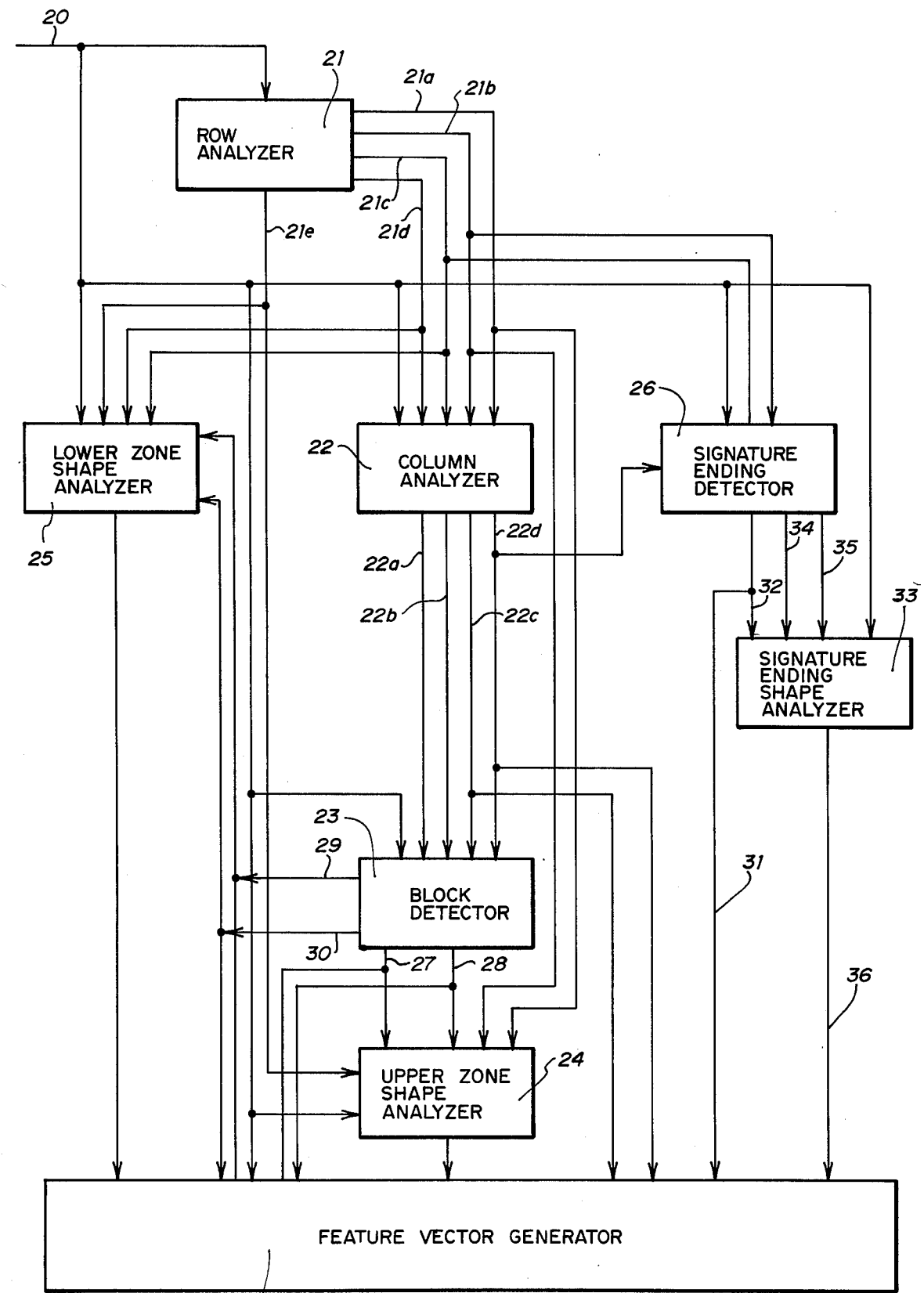
FIG. 2 is a detailed functional block diagram of the feature detector of FIG. 1.
Figure 3:
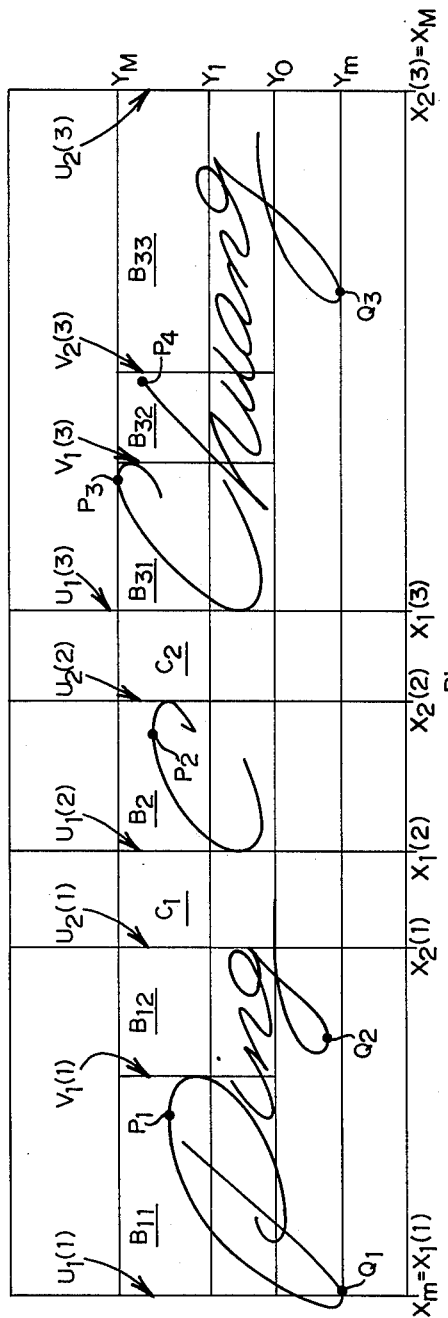
FIG. 3 is an illustration of a Ping C. Chuang signature with no signature ending.

FIGURES 2 and 3

FIG. 2 is a detailed functional block diagram of the feature detector 12 with feature vector generator 13, and FIG. 3 is an illustration of a Ping C. Chuang signature which shall be referred to in describing the operation of the system of FIG. 2.

Binary signature image data is supplied by subimage acquisition unit 11 on a data line 20 leading to first inputs of a row analyzer 21, a column analyzer 22, a block detector 23, an upper zone shape analyzer 24, a lower zone shape analyzer 25, a signature ending detector 26, a signature ending shape analyzer 33 and feature vector generator 13. Row analyzer 21 scans the signature image in the horizontal direction from the bottom to the top to define the signature base line $Y_o$, the upper boundary of non-capital letters $Y_1$, the lowermost signature boundary $Y_m$, and the uppermost signature boundary $Y_M$. The $Y_M$ output of row analyzer 21 is applied along a data line 21a to a second input of column analyzer 22, and to a second input of shape analyzer 24. The $Y_1$ output of analyzer 21 is applied along a data line 21b to a third input of analyzer 22, to a second input of detector 26 and to a third input of analyzer 24. The $Y_o$ output of analyzer 21 is connected by way of a data line 21c to a fourth input of analyzer 22, a second input of analyzer 25 and to a third input of detector 26. The $Y_m$ output of analyzer 21 is connected by way of a data line 21d to a third input of analyzer 25 and to a fifth input of analyzer 22.

Row analyzer 21 also detects the number of elements between horizontally adjacent segments, and forwards such information by way of a data line 21e to a fourth input of analyzer 25 and to a fourth input of analyzer 24.

Column analyzer 22 vertically scans the signature image within the band defined by $Y_m$ and $Y_M$ to find the beginning, $X_m$, and ending, $X_M$, of a signature image according to the number and the magnitude of the segments detected. In addition, the beginning, $U_1(i)$, and ending, $U_2(i)$, of each word of the signature is detected as the column sequence proceeds from the left to the right of the signature image. The $U_1(i)$ and $U_2(i)$ outputs of analyzer 22 are connected by way of data lines 22a and 22b, respectively, to corresponding inputs of block detector 23. The $X_m$ output of analyzer 22 is applied along a data line 22c to a fourth input of detector 23 and to a second input of feature vector generator 13. The $X_M$ output of analyzer 22 is applied along a data line 22d to a fourth input of detector 26, a fifth input of detector 23 and to a third input of generator 13.

Block detector 23 subdivides the signature image into word blocks, and further subdivides the word blocks into subblocks each having a single capital or tall letter. The Y-coordinates of the topmost black elements of each subblock in the upper zone of the signature image and the lowermost black elements in the lower zone of the signature image then are detected. The upper zone X-coordinate information $P_i(X)$ is applied by way of a data line 27 to a fourth input of generator 13, and to a fifth input of analyzer 24. The upper zone Y-coordinate information $P_i(Y)$ is applied by way of a data line 28 to a fifth input of generator 13 and to a sixth input of analyzer 24. The lower zone X-coordinate information $Q_i(X)$ is supplied to a fifth input of analyzer 25 and to a sixth input of generator 13 by way of a data line 29, and the lower zone Y-coordinate information $Q_i(Y)$ is supplied to a data line 30 leading to a sixth input of analyzer 25 and to a seventh input of generator 13.

Shape analyzer 24 compares the shape of the signature image about upper zone signature peaks with a set of known upper zone patterns, and signals generator 13 upon the occurrence of a match. In like manner, shape analyzer 25 compared with the shape of the signature image about the lowermost signature peaks with a set of known lower zone patterns.

Signature ending detector 26 vertically scans the signature image for column characteristics indicating the presence of excessive or decorative strokes at the end of a signature. If a signature ending is detected, detector 26 issues a pulse along a control line 31 to generator 13, and along a control line 32 to signature ending shape analyzer 33. In addition, detector 26 detects the beginning ($X = E_2$) and end ($X = E_1$) of the signature ending as will be further discussed below, and supplies such information to analyzer 33 by way of data lines 34 and 35, respectively. Upon receiving a pulse from detector 26, shape analyzer 33 compares the signature ending with a set of known ending patterns, and forwards the identity of the matching pattern along a control line 36 to generator 13.

In operation, row analyzer 21 receives a binary signature image on data line 20 from subimage acquisition unit 11 of FIG. 1, and scans the signature image in the horizontal direction from the bottom to the top. Each row of the image then is characterized by the total number of black cells A; the number of segments (a collection of consecutive black cells) B; and the element size of the spaces between any two adjacent segments C.

The term black cells as used herein corresponds to those video sensor cell responses indicating the presence of information. In addition, the term "segment" refers to a character stroke, a cross section of a character stroke or a signature base line. The sensor array is actuated at time intervals related to relative movement between intervals such that the signal is sampled columnwise every 0.008 inches.

From the attributes A and B, the rows of the signature image are classified as $Y_m$, $Y_o$, $Y_l$ and $Y_M$ rows as illustrated in FIG. 3. $Y_m$ refers to the lowermost signature boundary, $Y_o$ to the signature base line, $Y_l$ to the upper boundary of non-capital letters and $Y_M$ to the uppermost signature boundary. More particularly, the row where attribute A is greater than zero, and the attribute A of the previous three rows is zero, is designated as $Y_m$, the lowermost boundary of the signature image. The row for which the attribute A is greater than 200, and the value of attribute B for a sixth row is within the range of 10 to 14 is designated as $Y_o$, the base line of the signature image. The row satisfying the criteria that attribute A is less than 150, attribute B is less than 12 and attribute B is greater than 11 for the previous five rows is designated $Y_l$. Further, the row having an attribute A greater than zero and immediately followed by three rows having an attribute A equal to zero is designated as $Y_M$, the uppermost boundary of the signature image.

$Y_o$ and $Y_l$ collectively define a middle zone envelope for non-capital letters. In addition, $Y_o$ and $Y_m$ define a lower signature zone, and $Y_l$ and $Y_M$ define an upper signature zone.

Attribute C is detected on a row by row basis and forwarded to shape analyzers 24 and 25 as will be further explained.

It is to be understood that the values for attributes A, B and C are representative, and may be tailored for a particular signature environment.

Column analyzer 22 vertically scans the signature image within the band defined by $Y_m$ and $Y_M$ to detect the beginning, $X_m$, and ending, $X_M$, of a signature image according to the number and the magnitude of the segments detected. More particularly, an image is scanned vertically from left to right to determine $X_m$, and from right to left to determine $X_M$. The column for which either attribute A is greater than 6 or attribute B is greater than 1, and the next two columns have the identical attributes, and the previous column does not have such identical attributes is designated $X_m$. $X_M$ is found according to the same criteria as that for $X_m$, with the vertical scanning proceeding from the right end of the field of view.

The signature image within the region defined by $X_m$, $X_M$, $Y_M$ and $Y_o + \alpha$ also is scanned in the vertical direction to locate the columns where the words comprising a signature begin and end. $\alpha$ is a predetermined integer which effects the removal of the signature base line from the signature image analysis. The value of $\alpha$ is dependent upon the resolution of the signature image. For example, with a resolution of one sample point per 8 mils, $\alpha$ is set to a fixed value of five.

The criteria for determining the beginning and ending of signature words in a transition from zero to non-zero segments for two adjacent columns at the beginning, $U_1(i)$, of a word, and a non-zero to zero segment transition for two adjacent columns at the ending, $U_2(i)$, of the word as the column sequence proceeds from the left to the right of the image. Referring to FIG. 3, it may be seen that there are three words in the illustrative signature: Ping C. Chuang. Thus, there are three word beginnings: $U_1(1)$, $U_1(2)$ and $U_1(3)$; and three word endings: $U_2(1)$, $U_2(2)$ and $U_2(3)$. $U_1(1)$ occurs at $X_1(1) = X_m$, $U_2(1)$ at $X_2(1)$, $U_1(2)$ at $X_1(2)$, $U_2(2)$ at $X_2(2)$, $U_1(3)$ at $X_1(3)$ and $U_2(3)$ at $X_2(3) = X_M$.

Block detector 23 receives $X_m$, $X_M$, $U_1(i)$ and $U_2(i)$ from column analyzer 22, and divides the signature image into vertical zones or blocks. For example, referring to the signature of FIG. 3, the region between $X_m$ and $X_2(1)$ may be designated a first block $B_1$. Further, the region between $X_1(2)$ and $X_2(2)$ may be designated block $B_2$, and the region between $X_1(3)$ and $X_M$ designated block $B_3$. A block indication is ignored as a false block when the block size in columns is less than forty (40), and the separation (i.e., $C_1$ or $C_2$ in FIG. 3) from a succeeding block is less than ten (10) columns.

For the purpose of finding top parts of capital as well as tall letters in a signature, each block of the signature image is further divided into subblocks according to the change in column characteristics. The controlling attribute of a column characteristic is the Y-coordinate of the topmost black element of the column. If the discontinuity in the Y-coordinates of two adjacent columns exceeds a threshold value, and the value of one of the columns in question is comparable to $Y_l$, then the line for division between subblocks is established at that one of the two columns having the larger Y-coordinate. In the preferred embodiment, the difference between the Y-coordinates of topmost elements from two adjacent columns is computed. A vertical line for a subblock is established if the difference is greater than ten, and the Y-coordinate of one of the two adjacent columns in question is greater than the arithmetic average $(Y_o + Y_M)/2$.

Block $B_1$ is separated thereby into subblocks $B_{11}$ and $B_{12}$ as illustrated by vertical line $V_1(1)$ of FIG. 3, and block $B_3$ is separated into subblocks $B_{31}$, $B_{32}$ and $B_{33}$ as illustrated by vertical lines $V_1(3)$ and $V_2(3)$. Each subblock includes a single capital or tall letter. The highest point of a block which is the top part of the capital or tall letter is registered by its X and Y-coordinates. Those points with Y-coordinates exceeding $Y_1$ are selected and ranked in the order of decreasing Y-coordinates. In FIG. 3, the points of interest are $P_1$, $P_2$, $P_3$ and $P_4$.

Shape analyzer 24 horizontally scans a region or domain about each selected point of the upper zone signature image, and detects the row attributes of each such domain. The row attributes detected are the number of segments in a row, the leftmost element in a row, and the rightmost element in a row.

A domain is defined only for a row at a time, and is that section of a row occupied by a signature image. A shape analysis for the geometry about the topmost point of a character, however, involves a set of rows. The number of rows required for a shape analysis in the preferred embodiment is equal to one-third of the difference between $Y_M$ and $Y_1$. The shape analysis for the topmost point of a tall character (i.e., $P_1$, $P_2$, $P_3$ and $P_4$ of FIG. 3) starts at the row defined by the Y-coordinate of that point. The first domain to be analyzed, therefore, is the smallest section of the row containing a character segment having the highest point of the character image. The domain in which the row attributes of a next row are to be measured initially is found from the domain of the previous row, and contracted or extended therefrom to include a character segment found to be unfinished under the domain of the previous row.

With the domain of measurement so defined, the row attributes, and subsequently the geometry of the character strokes, can be determined from the number of segments and the leftmost and the rightmost black elements in each row of a domain.

FIG. 4

Figure 4:
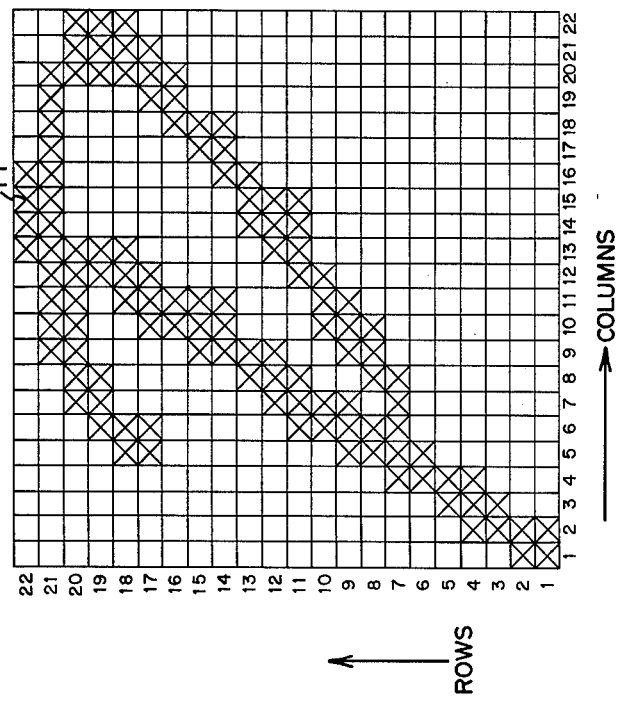
FIG. 4 illustrates a binary character image from which domains and row attributes about a topmost point $P_1$ are to be determined for a shape analysis.

FIG. 4 illustrates a character image having a topmost point $P_1$. A shape analysis of the character image yields the data listed in Table I.

TABLE I

| DOMAIN D(ROW) | NUMBER OF BLACK CELLS(A) | NUMBER OF SEGMENTS(B) | LEFTMOST COLUMN | RIGHTMOST COLUMN | SPACE SIZE(C) |
|---|---|---|---|---|---|
| D(22) | 4 | 1 | 13 | 16 | — |
| D(21) | 12 | 1 | 9 | 20 | — |
| D(20) | 10 | 2 | 7 | 22 | 6 |
| D(19) | 8 | 3 | 6 | 22 | 3,6 |
| D(18) | 8 | 3 | 5 | 22 | 4,6 |
| D(17) | 8 | 3 | 5 | 21 | 3,6 |
| D(16) | 5 | 2 | 10 | 20 | 6 |
| D(15) | 5 | 2 | 9 | 18 | 5 |
| D(14) | 6 | 2 | 9 | 18 | 4 |
| D(13) | 5 | 2 | 8 | 16 | 4 |
| D(12) | 6 | 2 | 7 | 15 | 3 |
| D(11) | 7 | 2 | 6 | 15 | 3 |
| D(10) | 5 | 2 | 6 | 12 | 2 |
| D(9) | 6 | 2 | 5 | 11 | 1 |
| D(8) | 5 | 2 | 5 | 10 | 1 |
| D(7) | 5 | 1 | 4 | 8 | — |
| D(6) | 2 | 1 | 4 | 5 | — |
| D(5) | 2 | 1 | 3 | 4 | — |
| D(4) | 3 | 1 | 2 | 4 | — |
| D(3) | 2 | 1 | 2 | 3 | — |
| D(2) | 2 | 1 | 1 | 2 | — |
| D(1) | 2 | 1 | 1 | 2 | — |

As before described, the number of rows and thus domains employed for a shape analysis in the preferred embodiment is equal to one-third of the difference between $Y_M$ and $Y_1$. For the signature illustrated in FIG. 3, only domains D(22)-D(17) are employed for a shape analysis.

Figures 6, 7:
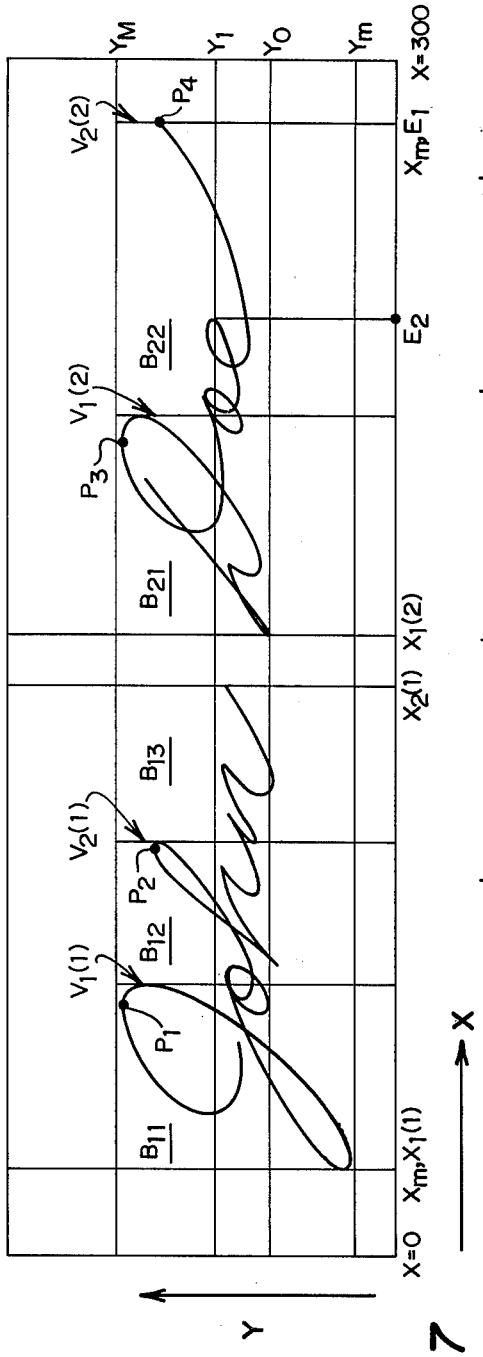
FIG. 6 is a table of patterns used in the shape analysis of a lower zone of a signature image.
FIG. 7 is an illustration of a John Doe signature having a signature ending.

FIGS. 5 and 6

FIGS. 5 and 6 are tables of patterns used in the shape analysis of the upper and lower zones, respectively, of a signature image.

Upon the detection of the row attributes about the uppermost points of a signature image, upper zone shape analyzer 24 of FIG. 2 compares the geometry of the strokes for each such point to one of seven patterns illustrated in FIG. 5. Pattern matches for each such point are signalled to the feature vector generator 13 of FIG. 1.

Referring to FIG. 5, a simple bar is identified when there is detected a sequence of rows having dominantly a single segment with a stroke width less than seven elements or sensor cell widths. A normal cap is identified when there is detected a sequence of rows first having a single segment that later separates into two segments spaced by less than ten sensor cell widths. Further, an extended cap is identified when a sequence of rows occurs that have a single segment which later separates into two segments spaced by at least ten sensor cell widths. A horizontal bar occurs when a sequence of rows is detected beginning with a single segment of magnitude greater than fifteen sensor cell widths, followed by a single segment of magnitude less than seven sensor cell widths. In addition, a cross bar is identified when there is detected a sequence of rows beginning with a single segment of magnitude less than seven sensor cell widths, followed by a single segment of magnitude greater than fifteen sensor cell widths, and later changing to a single segment of magnitude less than seven sensor cell widths. A left angle is identified when a sequence of rows is detected beginning with a single segment of magnitude greater than ten sensor cell widths, followed by a single segment whose leftmost black element is at least ten sensor cell widths to the right of the leftmost element of the previous row. A right angle is identified when a sequence of rows is identified beginning with a single segment of magnitude greater than ten sensor cell widths, followed by a single segment whose rightmost black element is at least ten sensor cell widths to the left of the rightmost element of the previous row. Any row pattern other than the seven patterns defined above is identified by a code 8.

The output of block detector 23 also is applied to the lower zone shape analyzer 25. In the zone bound by $Y_o$ and $Y_m$, a set of points corresponding to the lowest point of such letters as $f, g, j, p. q$ and $y$ are found. More particularly, those image points with Y-coordinates less than $Y_o$ are selected and arranged in the order of increasing value of their Y-coordinates. In FIG. 3, such points are illustrated in the lower signature zone as $Q_1$, $Q_2$ and $Q_3$.

Shape analyzer 25 scans horizontally the signature image to determine the number of segments in a row, and the leftmost and rightmost black elements in each row of a set of rows in those domains in the lower signature zone about the image points $Q_1$, $Q_2$, and $Q_3$. The geometry of the character strokes about each of the $Q_i$ image points then is compared to the four lower zone patterns illustrated in FIG. 6. When a pattern identification occurs, a coded representation of the pattern is forwarded to the feature vector generator 13.

From an inspection of FIGS. 5 and 6, it may be seen that a simple bar in the lower signature zone corresponds to a simple bar in the upper zone. Further, a normal cup in the lower zone corresponds to a normal cap in the upper zone, and an extended cup in the lower zone corresponds to an extended cap in the upper zone. Any sequence of rows in the lower zone other than the three categories above described is identified by a code 4.

Signature ending detector 26 vertically scans the signature image for column characteristics indicating the presence of a signature ending. As before described, a signature ending is defined to be the excessive or the decorative strokes beyond the ordinary letter strokes. The scanning begins at $X_M$ and proceeds leftward until one of two events occurs: (1) the number of segments in a column is greater than 2 in more than two consecutive columns, or (2) the difference between the topmost black elements of adjacent columns exceeds a threshold equal to one-half of the difference between $Y_1$ and $Y_o$. The number of columns which are processed during a vertical scanning before one of the two events occurs is the measure of the magnitude of a signature ending.

FIGS. 7, 8A and 8B

FIG. 7 illustrates a signature having a signature ending, and FIGS. 8A and 8B illustrate patterns used in the shape analysis of a signature ending.

The signature illustrated in FIG. 7 exhibits a signature ending starting at $X = E_2$. The magnitude of the signature ending is measured by the number of columns between $X = E_1$ and $X = E_2$. A signature ending as that term is employed herein is present if $(E_1 - E_2)$ is greater than one-tenth of the signature size in columns in the X-direction.

When a signature ending is present, the ending is compared to one of two patterns as illustrated in FIGS. 8A and 8B. A particular pattern is identified by the trend of the topmost black elements $Y_{Ei}$ in a column sequence constituting a signature ending. For example, if the topmost Y-coordinates are $Y_{E_1}$ at $X = E_1$ and $Y_{E_2}$, then a flat thread exists if $|Y_{E_1} - Y_{E_2}| > 10$. When a pattern is identified, the pattern code is forwarded to the feature vector generator 13 of FIG. 1.

Generator 13 generates upper zone, lower zone and signature ending feature vectors from the information received from the analyzers 22, 24, 25 and 33, and from detectors 23 and 26. By way of example, a set of peaks $P_i$ in the upper zone of a signature may be numerically represented by a set of pairs $\{P_i(Y), r_i\}$, where $i = 1, \ldots, n$, and $n$ is the number of peaks. The $P_i(Y)$ are the heights of the peaks with respect to a base line, and the $r_i$ are the ranks of the peaks with respect to height. A feature vector in the upper zone may be represented by the set $(\overline{P_i(X_d)}, r_i, S_i)$, where the $\overline{P_i(X_d)}$ are the normalized distances of the peaks from the left boundary of the signature, and the $S_i$ are the shapes of the signature about the peaks $P_i$ as represented by coded numerals.

The $\overline{P_i(X_d)}$ are defined by the equation, $$\overline{P(X_d)} = 10 \times (X_d - X_m) / (X_M - X_m), \tag{A}$$

where $X_d$ is an integer representing the distance from the left boundary of a signature, and $X_m$ and $X_M$, respectively, are equal to the X-coordinates of the beginning and ending of a signature. Thus, $\overline{P(X_d)}$, a rounded integer, is a measure of the distance between the beginning of a signature and a peak, such distance being normalized to a value between zero and ten. In the preferred embodiment described herein, the $r_i$ and $S_i$ also are limited to values between zero and ten.

Each feature vector represents a numerical characterization of certain aspects of the writing style of the author. A signature image zone may be represented by a set of feature vectors $(f_i)$, where $i = 1, \ldots, n$, and the $f_i$ are the feature vectors comprising the set. The length $(n)$ of a vector set is dependent upon the number of peaks in an image zone.

A feature vector set for the lower zone of a signature image is formed in a manner analogous to that for an upper zone. The peaks $Q_i$, however, are ranked in the order of increasing Y-coordinates.

A signature ending may be represented by a single vector of the form: $F_E = (E, T)$, where E may be a logic one or a zero depending upon whether a signature ending exists, and T may be a one or a two depnding upon whether the shape of the signature ending corresponds to a flat thread or an ascending thread pattern.

It is thus seen that each signature sample of an individual may be represented by three feature vector sets respectively representative of the upper zone, lower zone and ending of the signature image: $F_U = (f_U)$, $F_L = (f_L)$, and $F_E = (f_E)$, where $i, j$ and $k$ represent the number of feature vectors in the respective sets.

FIG. 9

Figure 9:
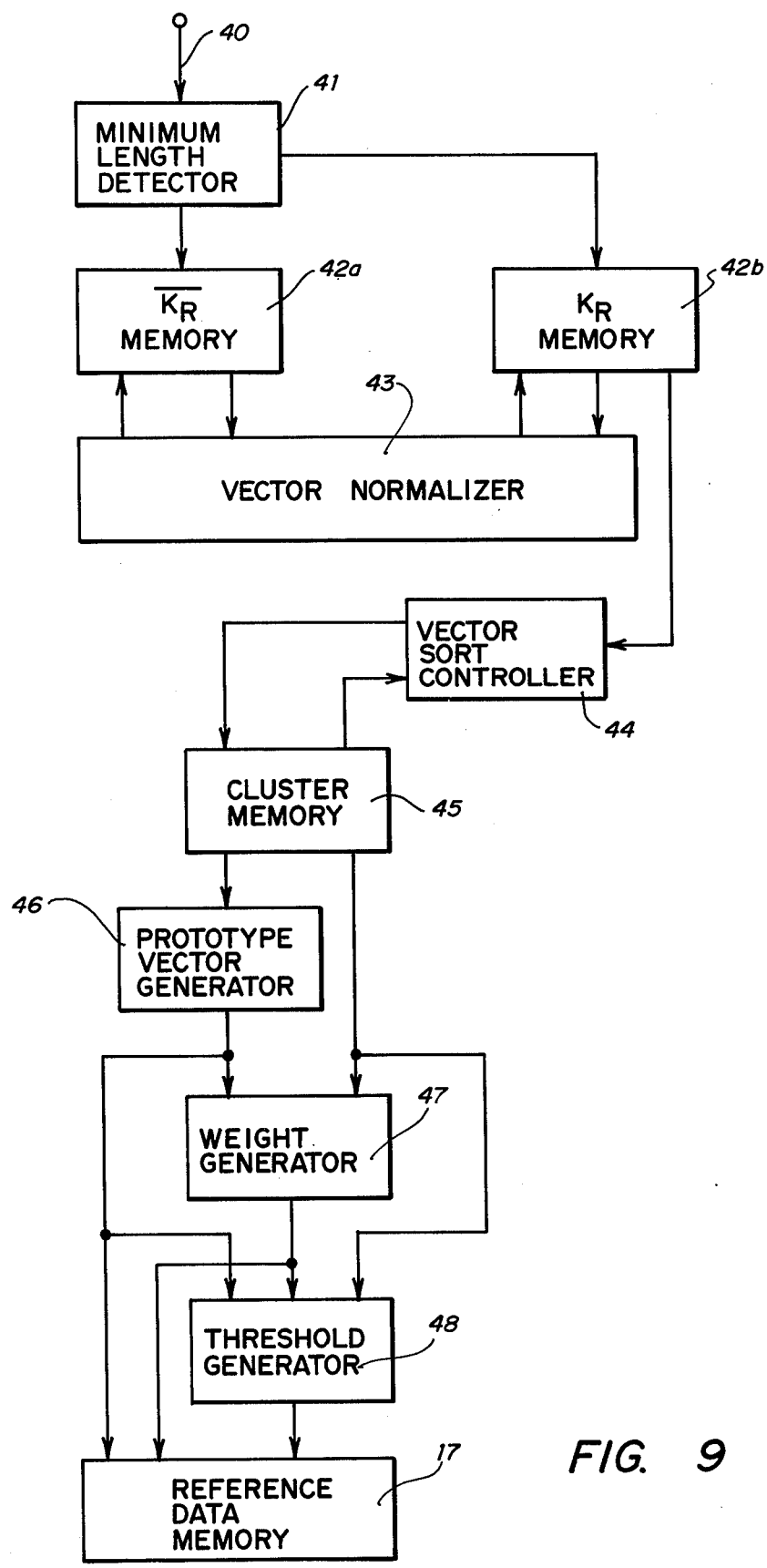
FIG. 9 is a detailed functional block diagram of the vector compressor and decision parameter generator of FIG. 1.

FIG. 9 is a more detailed functional block diagram of the vector compressor unit 14 and the decision parameter generator 15 of FIG. 1.

In theory, the length $(n)$ of a vector set should remain fixed from signature to signature of an individual. A signature of poor quality written in haste or with an instrument providing a script of inferior optical properties, variations in background contrast and errors which may result in a feature extraction process, however, may effect a change in the vector length of the signature samples of the same individual. Thus, the number of peaks or local Y-coordinate maximas in the upper zone of a signature image may not be constant for all signature samples of the same individual.

Feature vectors generated by the feature vector generator 13 of FIG. 1 are received by way of a data line 40 at the input of a minimum length detector 41. Detector 41 separates those vector sets having a minimum vector length from the remaining vector sets. The vector sets of minimum length are supplied to a $K_R$ memory unit 42b, while the remaining vector sets are forwarded to a $\overline{K_R}$ memory unit 42a.

A vector normalizer 43 normalizes the vector lengths of the vector sets stored in memory unit 42a to correspond with the vector lengths of memory unit 42b. Upon completion of the normalization process, the vector sets of memory unit 42a are loaded into memory unit 42b.

A vector sort controller unit 44 addresses each feature vector set of memory unit 42b, and collects the vector sets into groups called vector clusters stored in a cluster memory unit 45. Each vector cluster is representative of a zone or ending of a signature image, and includes plural feature vector sets derived from plural signatures of an author.

A first output of cluster memory 45 is connected to one input of a prototype vector generator 46, and a second output of the memory unit is connected to one input of a weight generator 47 and to one input of a threshold generator 48. Generator 46 operates upon each vector cluster of memory unit 45 to form a prototype vector representative of the cluster. The output of generator 46 is supplied to a second input of weight generator 47, to a second input of threshold generator 48 and to one input of reference data memory unit 17.

Weight generator 47 assigns a weight to each component of the prototype vector, and forwards such weights to a third input of threshold generator 48 and to a second input of memory unit 17.

Threshold generator 48 generates a decision threshold for a decision rule operation, equation G-1, below includes generation of the prototype vector and the weights assigned thereto as decision parameters. The output of generator 48 is connected to a third input of reference data memory unit 17. The upper zone, lower zone and signature ending of an authorized signature each are represented by a prototype vector, weights assigned to each component of the prototype vector and a threshold value stored in unit 17.

In operation, minimum length detector 41 identifies over all authorized signatures of an author those vector sets of minimum length for the upper zone, lower zone and ending of a signature image. Such minimum length vector sets are collected in a set $K_R$ in memory unit 42b. Those vector sets having other than minimum lengths are collected in a set $\overline{K_R}$ in memory unit 42a.

The vector normalizer unit 43 compares each feature vector of the $\overline{K_R}$ vector sets with corresponding feature vectors of the $K_R$ vector sets, and normalizes the vector lengths of the $\overline{K_R}$ vector sets. More particularly, the normalized location $\overline{P(X_d)}$ of a peak, the rank of the peak based on its height and the shape of the strokes around the peak of a feature vector in $\overline{K_R}$ are compared with like properties of a feature vector previously stored in $K_R$. Such comparison is carried out in a hierarchial manner with the position of the Peak, $\overline{P(X_d)}$, being tested first. If the absolute difference in the position comparison is zero elements or sensor cell widths, the vector components corresponding to the particular peak of the signature in $\overline{K_R}$ are retained.

If the absolute difference in position is greater than one element, the vector components associated with the peak in question are removed from the $\overline{K_R}$ vector set. The current peak of the $K_R$ vector then is compared with a peak of a next vector of the $\overline{K_R}$ vector set which is adjacent in position to the vector removed.

If the absolute difference in position is zero elements, the adjacent vector of the $\overline{K_R}$ vector set is retained and shifted into the position of the removed vector. If the absolute difference in position is greater than one element, the adjacent vector also is removed. Where the absolute difference in position is equal to one element, however, a comparison is made between the ranks of the current vector of the $K_R$ vector set and the adjacent or now current vector of the $\overline{K_R}$ vector set.

The same test criteria is applied to the ranks as to the positions. In the event that the absolute difference in ranks is equal to one element, a comparison of shapes about the peaks is made. In the event that the absolute difference in shapes is greater than one element, the current vector of the $\overline{K_R}$ vector set is discarded and the process begins anew with a comparison between positions of the current vector of the $K_R$ vector set and a next vector of the $\overline{K_R}$ vector set.

In summary, a $K_R$ vector set is compared with a $\overline{K_R}$ vector set by first comparing their peak positions on a vector by vector basis. If the absolute difference between positions of first vectors is zero elements, the first vector components of the $\overline{K_R}$ vector set are retained. If the absolute difference is greater than one element, the vector components of the $K_R$ vector are removed. Where the absolute difference is equal to one element, however, a comparison of ranks is initiated under the same test rules. If the absolute difference in ranks is equal to one, a comparison of shapes is initiated under a modified set of rules. The modification is that the vector components of the $\overline{K_R}$ vector are removed if the absolute difference in shapes is greater than one or equal to one element.

By way of example, the three upper zone feature vector sets of Table II, respectively, were formed from three authorized signatures.

TABLE II

| VECTOR | POSITION | RANK | SHAPE | |
|---|---|---|---|---|
| FU1 = | 1<br>4<br>6<br>7 | 3<br>4<br>1<br>2 | 3<br>3<br>3<br>2 | (B) |
| FU2 = | 1<br>2<br>3<br>6<br>7 | 3<br>5<br>4<br>1<br>2 | 3<br>8<br>3<br>3<br>2 | (C) |
| FU3 = | 1<br>4<br>6<br>7 | 3<br>4<br>1<br>2 | 3<br>3<br>3<br>1 | (D) |

The set $K_R = \{FU1, FU3\}$, since the number of components $(n)$ is equal to 12 for both FU1 and FU3. The set $\overline{K_R} = \{FU2\}$, however, since the number of components $(n)$ is equal to fifteen. The vector FU2, therefore, is subjected to the following sequence of logic steps to convert a 5 × 3 vector set or matrix to a 4 × 3 matrix:

1. Compare peak positions of first vectors;

$$|FU1_{11} - FU2_{11}| = |1 - 1| = 0.$$

2. Retain components of first vector of vector sets FU2;

3. Compare peak positions of next successive vectors;

$$|FU1_{21} - FU2_{21}| = |4 - 2| > 1.$$

4. Reject vector components of second vector of FU2;

5. Compare peak position of current vector of FU1 with peak position of next vector of FU2;

$$|FU1_{21} - FU3_{31}| = |4 - 3| = 1.$$

Compare rank of current vector of FU1 with rank of current vector of FU2;

$$|FU1_{22} - FU2_{32}| = |4 - | = 0.$$

7. Retain components of third vector of FU2, and shift the components to the second vector position;

8. Compare the peak position of a next vector of FU1 with the peak position of a next vector of FU2;

$$|FU1_{31} - FU2_{41}| = |6 - 6| = 0.$$

9. Retain vector components of current vector of FU2, and shift the components to the third vector position;

10. Compare the peak position of a next vector of FU1 with the peak position of a next vector of FU2; and $$|FU1_{41} - FU2_{51}| = |7 - 7| = 0.$$

$$FU2 = \begin{vmatrix} 1 & 3 & 3 \\ 3 & 4 & 3 \\ 6 & 1 & 3 \\ 7 & 2 & 2 \end{vmatrix}, \quad (E)$$

and is added to the set $K_R$.

Upon completion of the normalization of the $\overline{K_R}$ vector sets, vector sort controller 44 addresses the vector sets of memory 42b, and stores each such set in a vector cluster of cluster memory 45.

Two vector sets are in the same cluster if (i) their lengths "n" are equal, and (ii) eighty percent (80%) or more of the vector components of the two sets differ by less than two. A vector set in question is tested against other vector sets in a cluster. If the test is successful, the vector set in question is placed in the cluster. Otherwise, the test continues with vector sets in other clusters until a particular cluster is found for the vector set in question.

By way of example, the vector sets FU1, FU2 and FU3 of equations B, D and E, respectively, each are of a length $n = 12$, and 80% of their components $FU_{ij}$ differ by less than two. Thus, FU1, FU2 and FU3 belong to the same cluster.

Prototype vector generator 46 averages the vector components of each vector set in a cluster to form a single representative vector called a prototype. More particularly, the value of a vector component of the prototype vector is found by averaging to the nearest integer the values of like vector components occurring in a cluster. As before described, the range of every vector component or feature variable is restricted to an integer between zero and ten. Since the prototype of a variable is approximately the sample mean, the value of a prototype component must be between zero and ten.

The prototype vector representing the vectors FU1, FU2 and FU3 is:

$$PT = \begin{vmatrix} 1 & 3 & 3 \\ 4 & 4 & 3 \\ 6 & 1 & 3 \\ 7 & 2 & 3 \end{vmatrix} \quad (F)$$

The weight generator 47 assigns a weight to each component of the prototype vector to provide a decision parameter for the verification process. A weight is a measure of the likelihood that a vector component of a new sample of a signature will be identical to a like vector component of a prototype. A weight is based on the histogram of the vector components of all the signature samples. If the maxima in the histogram of the vector component occurs in more than 90% of the total number of samples, the weight is set to three. If the maxima occurs in between 90% and 70% of the samples, the weight is set to two. If between 70% and 50%, the weight is set to one. The weight is set to zero if the maxima occurs in less than 50% of the signature samples. It is to be understood that for purposes of illustration, only three authorized signatures are used to generate a reference data set. Each component of the weight matrix, therefore, is limited to a value of one or three. The criteria for assigning weights, however, may be altered to correspond with the signature verification environment.

Referring to the prototype vector represented by Equation F, and further referring to the feature vector sets FU1, FU2 and FU3 as the complete histogram of each of the vector components, the following weight matrix may be formed:

$$\omega = \begin{vmatrix} 3 & 3 & 3 \\ 1 & 3 & 3 \\ 3 & 3 & 3 \\ 3 & 3 & 1 \end{vmatrix} \quad (G)$$

In addition to a weight, a threshold is associated with the prototype vector. Threshold generator 48 provides a threshold for which all sample signatures of an individual may be classified as valid by a decision rule which includes weight and prototype as decision parameters. The linear decision rule is of the form:

$$\sum_{i,j} \omega_{ij} |F_{ij} - PT_{ij}| < t_k, \quad (G-1)$$

where $\omega_{ij}$ are the weight components, $F_{ij}$ are the feature vector components, $PT_{ij}$ are the prototype vector components, $t_k$ are the thresholds associated with each vector set of a cluster and $k$ is a subscript which may be one of numbers 1 to 3 referring to the upper zone, lower zone or signature ending.

The threshold value associated with FU1 of Equation B may be determined as follows:

$$\begin{aligned} t_1 = & \ 3\ |1 - 1| + 3\ |3 - 3| + 3\ |3 - 3| \\ & + 1\ |4 - 4| + 3\ |4 - 4| + 3\ |3 - 3| \\ & + 3\ |6 - 6| + 3\ |1 - 1| + 3\ |3 - 3| \\ & + 3\ |7 - 7| + 3\ |2 - 2| + 1\ |2 - 2| \\ = & \ 0 \end{aligned}$$

In like manner, it may be seen that the threshold $t_2$ for FU2 of Equation E and the threshold $t_3$ for FU3 of Equation D may be represented respectively by:

$$t_2 = = 1 \ |4 - 3| + 1 \ |3 - 2| \models 2, \text{ and}$$

$$t_3 = 1 \ |3 - 1| \models 2.$$

Thus, the threshold associated with the prototype vector PT is:

$$t = \max(t_1, t_2, t_3) = \max(0, 2, 2) = 2.$$

The prototype, weight and threshold data are stored in reference data memory unit 17 for use during a signature verification operation.

The process for deriving a prototype vector, weight vector and threshold for the lower signature zone is analogous to that for the upper zone, and will not be further described.

FIG. 10

FIG. 10 illustrates a Ping C. Chuang signature, wherein a signature ending is present.

The process for developing a reference data set for a signature ending begins as with the upper and lower signature zone processes. For purposes of illustration, a set of three signature ending vectors is derived from a corresponding set of three signature samples. As before described, a signature ending vector may be of the form $F_E = (E_i, T_i)$, where E may be a one or zero to indicate the existence of a signature ending, and T may be a one or a two to respectively indicate the presence of a flat thread or an ascending thread pattern.

With the first two signature samples taken from the signature illustrated by FIG. 3, and the third signature sample taken from the signature of FIG. 10, it may be seen that the feature vectors for the first two signature samples are:

F1 = (0, 0), and
F2 = (0, 0).

Assuming that the signature ending of the third signature sample illustrated by FIG. 10 fits the flat thread model, the third feature vector may be represented as follows:

$$F3 = (1, 1).$$

In the preferred embodiment disclosed herein, when all of the components of the sample feature vectors are not equal, the reference data set becomes:

PT = (0, 0),
ω = (0, 0) and
t = (0, 0).

Thus, where the signature of a person does not consistently have a signature ending, the signature ending is given a weight of zero and is not considered as a criterion for signature verification. Where a signature ending does consistently appear, however, the reference data subset comprising a prototype vector, a weight and a threshold are determined as before discussed.

After the reference data sets including an upper zone subset, a lower zone subset and a signature ending subset have been generated, signature verification unit 16 of FIG. 1 compares the feature data of an unauthenticated signature with the reference data set of memory unit 17. More particularly, decision making in a verification process is based on a comparison between the style of a signature in question and that of a stored reference data set. The signature in question is designated as valid if it is similar to the reference data set. The upper zone subset including an upper zone prototype vector set, a weight matrix and a threshold are retrieved from the reference data memory unit 17. The similarity then is measured by comparing with the threshold t a weighted sum of the form, $$\sum_{j=1}^{3} \sum_{i=1}^{M} \omega_{ij} |F_{ij} - PT_{ij}|, \tag{H}$$

where M is the number of rows in a vector set, the $\omega_{ij}$ are the weights assigned to a prototype vector set, the $F_{ij}$ are the components of a feature vector set of an unauthenticated signature and the $PT_{ij}$ are the components of the prototype vector set. If the weighted sum is greater than the threshold, the signature is decided as invalid. Otherwise, the signature in question is compared with a next reference data set, and the process is continued until the upper zone, lower zone and signature ending subsets have been tested.

FIG. 11

Figure 11:
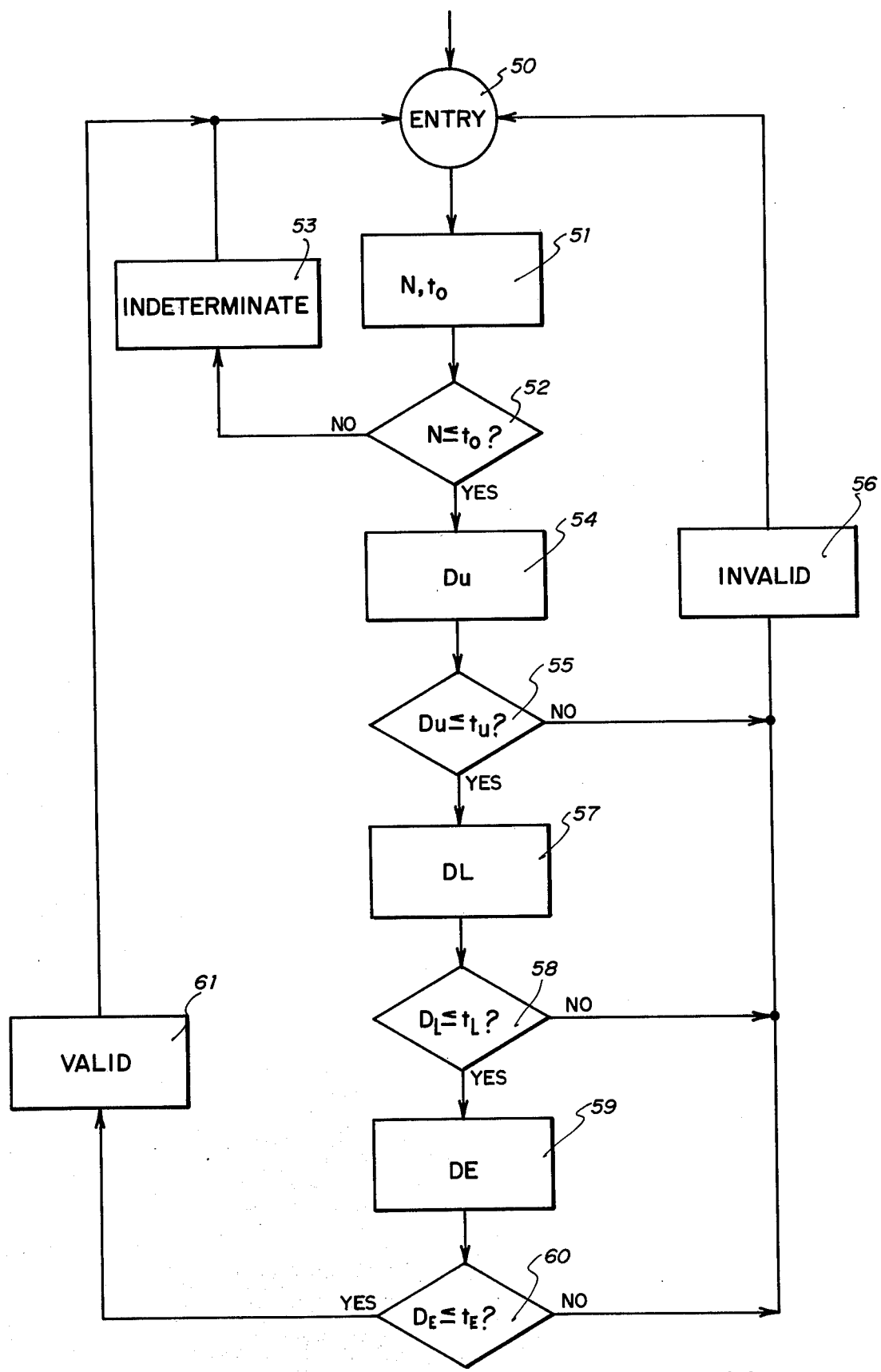
FIG. 11 is a logic flow diagram of a signature verification process.

The verification process further may be described by a tree structure as illustrated by FIG. 11 in which the structure is fixed for signatures of all individuals, but certain parameters defined by the reference data set are dependent upon the writing style of each individual.

Upon receiving the feature data of a signature to be verified, entry is made at a logic step 50 and a transfer is made to a logic step 51. At logic step 51, the weights associated with the upper zone prototype vector set of the reference data set are examined, and the number N of weights having a value less than two determined. Further, a threshold $t_o$ is determined as represented by the equation:

$$T_o = (0.60)(N_T), \tag{I}$$

where $N_T$ is the total number of weights. A transfer is made then from step 51 to a logic step 52 where N is compared with $t_o$.

If N is greater than $t_o$, the writing style of the author is considered indeterminate, and a transfer is made to a logic step 53 where the inability to test a signature is indicated. A transfer then is made from step 53 to step 50 where a new signature sample is awaited for verification. If N ≤ t, however, a transfer is made from step 52 to a logic step 54.

At step 54, the deviation between an upper zone vector set of the unauthenticated signature and the upper zone prototype vector set of the reference data set is determined as represented by the equation:

$$D_u = \sum_{j=1}^{3} \sum_{i=1}^{M} \omega_{ij} |F_{ij} - PT_{ij}|, \tag{J}$$

where M is equal to the number of rows in a vector set, $\omega_{ij}$ are the weights for the upper zone reference data subset, $F_{ij}$ are the components of the upper zone vector set of the unauthenticated signature and $PT_{ij}$ are the components of the upper zone prototype vector set of the reference data set.

From step 54, a transfer is made to a logic step 55 where $D_u$ is compared with the upper zone threshold $t_u$ of the reference data set. If $D_u > t_u$, a transfer first is made to a logic step 56 to indicate an invalid signature and thence to step 50. If $D_u \leq t_u$, a transfer is made from logic step 55 to a logic step 57.

At logic step 57, the deviation between the lower zone feature vector set of the unauthenticated signature and the lower zone prototype vector set of the reference data set is made according to the equation:

$$D_L = \sum_{j=1}^{3} \sum_{i=1}^{M} \omega_{ij} |F_{ij} - PT_{ij}|.$$

A transfer then is made from logic step 57 to a logic step 58 where $D_L$ is compared to the lower zone threshold $t_L$ of the reference data set.

If $D_L > t_L$, a transfer is made from step 58 to step 56 to indicate an invalid signature as before described. If $D_L \leq t_L$, however, a transfer is made from step 58 to a logic step 59.

At logic step 59, the deviation between the signature ending feature vector set of the unauthenticated signature and the signature ending prototype vector set of the reference data set is determined as represented by the equation:

$$D_E = \sum_{j=1}^{2} \omega_j |F_j - PT_j|.$$

A transfer then is made from step 59 to a logic step 60, where $D_E$ is compared with a signature ending threshold $t_E$ of the reference data set.

If $D_E > t_E$, a transfer is made from logic step 60 to logic step 56 to indicate an invalid signature. If $D_E \leq t_E$, however, a transfer is made from logic step 60 to a logic step 61 to indicate that the signature in question is valid. From step 61, a transfer is made to step 50 to await a new signature sample.

By way of example, the reference data subset for the upper zone of the Ping C. Chuang signature as illustrated in FIG. 3 includes the following information:

$$PT_u = \begin{vmatrix} 1 & 3 & 3 \\ 4 & 4 & 3 \\ 6 & 1 & 3 \\ 7 & 2 & 3 \end{vmatrix}; \quad \omega_u = \begin{vmatrix} 3 & 3 & 3 \\ 1 & 3 & 3 \\ 3 & 3 & 3 \\ 3 & 3 & 1 \end{vmatrix}; \text{ and } t_u = 2.$$

It is seen that there are two weights less than two. Thus, N = 2. Further, $t_o = (0.60)(N_T) = (0.60)(12) = 7.20$. Since $N < t_o$, the reference data set may be considered representative of the author's writing style and may be stored in memory unit 17.

If a John Doe signature as illustrated in FIG. 7 is to be verified against the reference data subset, an upper zone feature vector set representative of the signature must be formed. It may be seen by inspection that the signature has four upper zone peaks which may be represented by the set of pairs $(P_i(X), r_i)$. In the preferred embodiment described herein, the signature window is approximately 350 sensor cells in width and 125 sensor cells in height. Thus, the parameter $X_m$ of FIG. 7 occurs at about X = 15, $X_M$ occurs at about X = 280 and $X_2(1)$ occurs at about X = 150. The upper zone peaks of the John Doe signature may be approximated as follows: $P_1 = (65, 2); P_2 = (115, 4); P_3 = (215, 1);$ and $P_4 = (280, 3)$.

Normalizing the $P_i(X)$ to a value between zero and ten, there results: $P_1 = (2, 2); P_2 = (4, 4); P_3 = (8, 1);$ and $P_4 = (10, 3)$.

Referring to the code numbers of patterns to which character strokes about a peak in the upper zone may be modeled, it is seen that the upper zone feature vector set $FU = \overline{(P_{ij}(X_d), r_{ij}, S_{ij})}$ may be represented by:

$$FU = \begin{vmatrix} 2 & 2 & 3 \\ 4 & 4 & 2 \\ 8 & 1 & 3 \\ 10 & 3 & 1 \end{vmatrix}.$$

Computing $D_u$ from Equation J, $$D_u = 3|2-1|+3|2-3|+3|3-3|$$
$$+1|4-4|+3|4-4|+3|3-2|$$
$$+3|6-8|+3|1-1|+3|3-3|$$
$$+3|7-10|+3|2-3|+1|3-1|$$
$$= 3+3+3+6+9+3+2$$
$$= 29.$$

Since $D_u > t_u$, the signature of John Doe is not recognized as the signature of Ping C. Chuang, and an invalid signature is indicated.

FIG. 12

Figure 12:
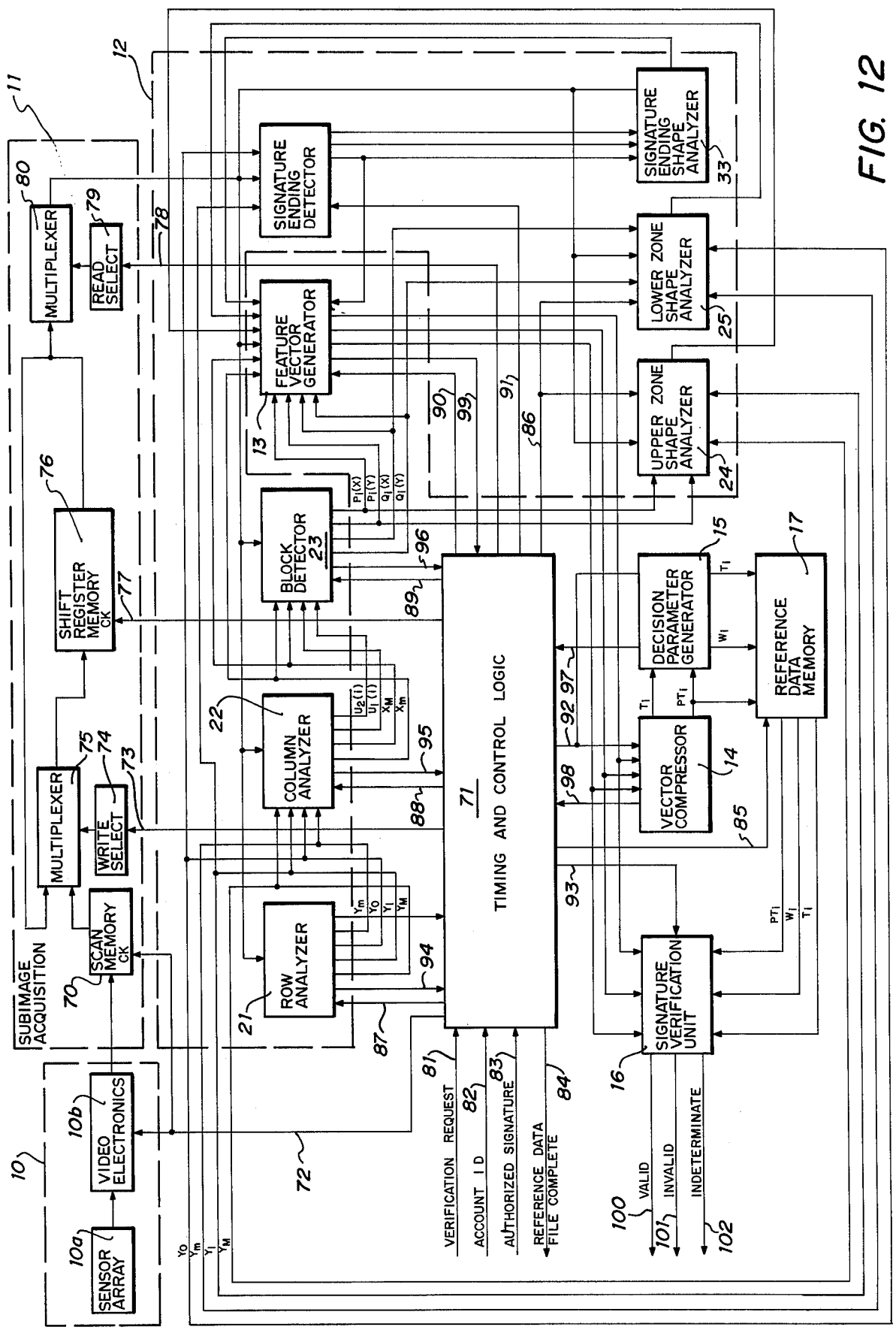
FIG. 12 is a functional block diagram of an automated signature verification system suitable for a commercial bank environment.

FIG. 12 illustrates an automatic signature verification system suitable for a commercial bank environment wherein a high volume of financial transactions are processed daily.

A signature is sensed by a photosensor array 10a, the responses of which are conditioned and digitized by a video electronics unit 10b. Array 10a and electronics unit 10b comprise video data lift unit 10 of FIG. 1.

The digitized video signals are transferred to a scan memory unit 70 under the control of a clock signal generated by a timing and control logic unit 71 on a control line 72. Upon receiving a pulse on a control line 73 leading from logic unit 71, a write select unit 74 selects a multiplexer 75 to the output of memory unit 70. Video data then is transferred a scan at a time from memory unit 70, and through multiplexer 75 to be stored in a shift register memory unit 76. In the event that no pulse is received on line 73, the write select unit 74 selects the multiplexer 75 to the output of memory unit 76 to effect a recirculation of a binary signature image stored therein.

Video data is received into and shifted out of shift register memory 76 under the control of a clock signal generated by logic unit 71 on a control line 77. Upon receiving a pulse on a control line 78 leading from an output of logic unit 71, a read select unit 79 selects a multiplexer 80 to the output of memory unit 76. Video data is fed serially from multiplexer 80 to feature detector 12 and feature vector generator 13 as before described. Scan memory unit 70, multiplexers 76 and 80, write select unit 74, read select unit 79 and shift register memory unit 76 comprise subimage acquisition unit 11 of FIG. 1.

Timing and control logic unit 71 receives a verification request on a control line 81, an account identification number on a data cable 82 and an authorized signature signal on a control line 83 each leading from an external operator's console. Logic unit 71 issues a reference data file complete signal on a control line 84 leading to the external operator's console, addresses reference data memory unit 17 by way of a data cable 84 and provides shape analyzers 24 and 25 with information relevant to the widths of spaces between character segments by way of a multibit data cable 86. Logic unit 71 further issues enable pulses on a control line 87 leading to row analyzer 21, on a control line 88 leading to column analyzer 22, on a control line 89 leading to block detector 23, on a control line 90 leading to feature vector generator 13, on a control line 91 leading to signature ending detector 26, on a control line 92 leading to vector compressor 14 and decision parameter generator 15 and on a control line 93 leading to signature verification unit 16.

Timing and control logic unit 71 further receives scan complete signals from row analyzer 21 by way of a control line 94, from column analyzer 22 by way of a control line 95, from block detector 23 by way of a control line 96, from decision parameter generator 15 by way of a control line 97, from vector compressor 14 by way of a control line 98 and from feature vector generator 13 by way of a control line 99.

In operation, upon receiving a clock signal on control line 72, sensor array 10a is scanned and the video responses are conditioned and digitized for transfer to scan memory unit 70. Multiplexer 75 then is selected to memory unit 70 for transfer of the video data a scan at a time to shift register memory unit 76.

Upon receiving an authorized signature indication on control line 83, control logic unit 71 enables row analyzer 21 and selects multiplexers 75 and 80 to the output of shift register memory unit 76. Under the control of a clock pulse on control line 77, the signature image is recirculated through multiplexer 75 and serially shifted out through multiplexer 80 to row analyzer 21.

Upon detecting the Y-coordinate boundaries of the signature image, analyzer 21 issues a scan complete signal on control line 94. Control logic unit 71 thereupon enables column analyzer 22 which vertically scans the signature image to detect the X-coordinate boundaries. Upon receiving a scan complete signal on control line 95, control logic unit 71 then enables block detector 23 which detects data peaks in the upper and lower image zones. After determining the coordinates of such peaks, detector 23 issues a scan complete signal on control line 96. In response thereto, control logic unit 71 enables feature vector generator 13 and signature ending detector 26.

After generating the feature vector sets for the upper region, the lower region and the signature ending as before described, generator 13 issues a scan complete signal on control line 99. Control logic unit 71 thereupon enables vector compressor 14 and decision parameter generator 15 for the generation of the reference data set to be stored in the reference data memory unit 17.

After the reference data set has been generated and stored in memory unit 17, the system is ready for a signature verification. Upon receiving a verification request on control line 81, the above-described process is repeated through the generation of the feature vector sets. Upon receiving the scan complete signal on control line 99, however, the control logic unit 71 in the verification mode does not enable vector compressor 14 or decision parameter generator 15. Rather, the signature verification unit 16 is enabled to compare the feature vector sets of the unauthenticated signature with the reference data sets of authorized signatures stored in memory unit 17. Upon completion of the verification process, verification unit 16 issues a valid signal on a control line 100, an invalid signal on a control line 101 or an indeterminate signal on control line 102.

As may be understood from the sequential operation of the signature verification system of FIG. 12, only a simplistic control logic well within the ordinary skill of the art is required.

FIG. 13

Figure 13:
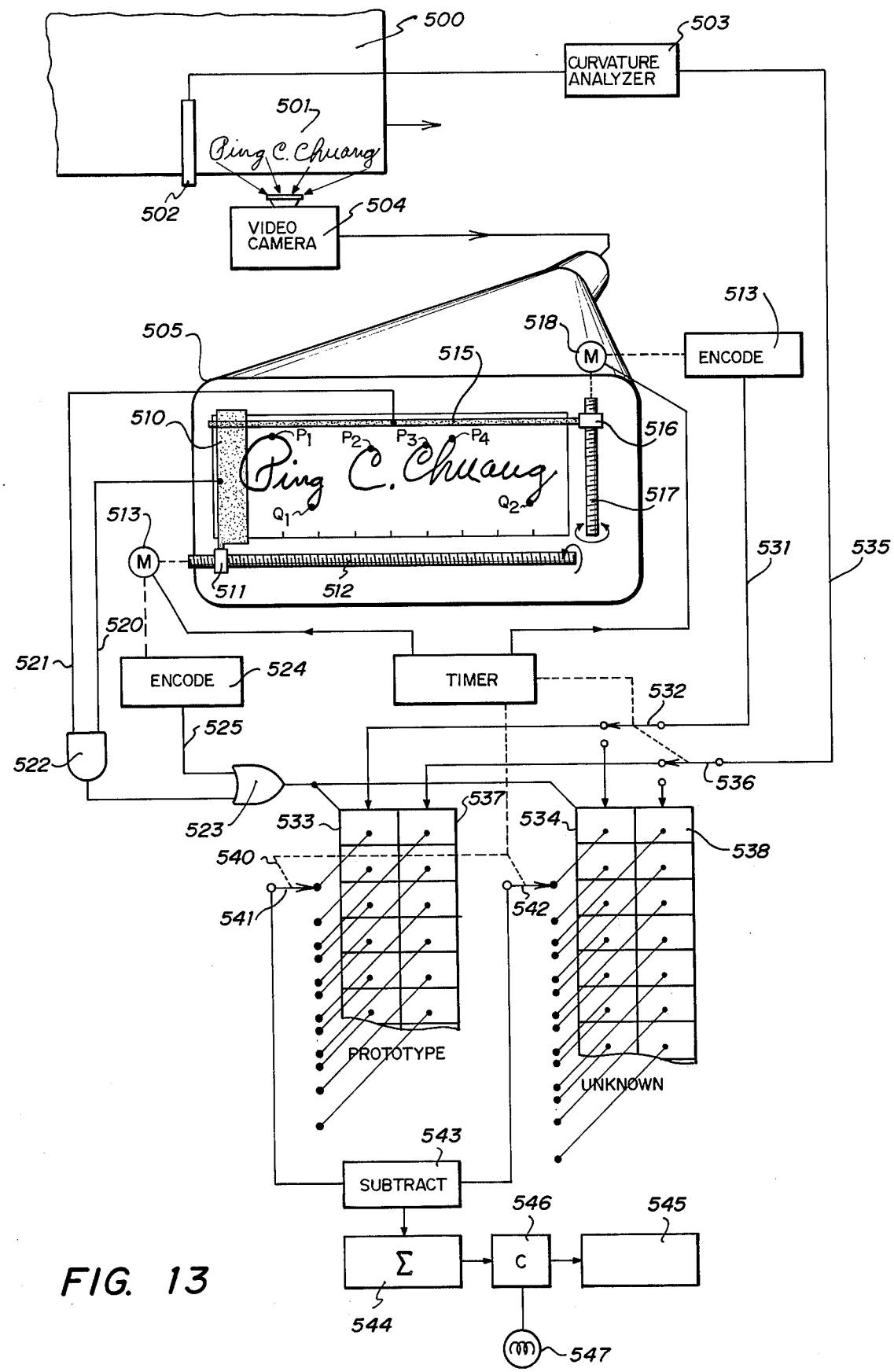
FIG. 13 illustrates a modified system embodying one aspect of the invention.

FIG. 13 illustrates a modified form of the system of FIG. 1 in which analog scanning is undertaken. More particularly, a document 500 on which a signature 501 appears is moved past a scanning head 502 which feeds a curvature analyzer 503. Analyzer 503 may be of the type disclosed in the above-identified patents No. 3,541,511 or 3,766,520.

In addition, the signature as it appears on document 500 is viewed by a video pickup unit 504 for display of the characteristics of the signature. Feature vector sets representative of an upper zone, a lower zone and an ending of plural authorized signatures of an author are collected into upper zone, lower zone and signature ending clusters. A single prototype vector set is derived from each cluster, and weights and a decision threshold are assigned to each prototype vector set to form a reference data set.

When an unauthenticated signature is to be verified, the signature is scanned, and feature vector sets representative of the upper zone, the lower zone and the ending of the signature are formed as for the authorized signatures. Weighted sums of differences between the feature vector sets of the unauthenticated signature and the reference prototype vector sets of the authorized signatures then are compared with the respective decision thresholds for the upper zone, lower zone and ending of the unauthenticated signature. If each weighted sum is less than or equal to the corresponding threshold, a valid signature is indicated. Otherwise, an invalid signature is indicated.

It will be seen that the generation of the feature vector set comprises detecting the coordinates in a two-dimensional array of the upper and lower peaks and signature ending. While the feature vector set as above described orders the elements in dependence upon position in the signature, it will be appreciated that they may be ordered in sequence of rank with position being a dependent variable. In either case, however, the shape parameter is a dependent variable. The analysis for shape is well known and may be carried out in accordance with the system and procedure described in patent 3,766,520, the same signature on the face of an oscilloscope 505 in accordance with techniques well known. The coordinate system on the display unit 505 are so adjusted that the signature occupies a field of uniform size regardless of the initial size of the signature.

A pair of scanners, one for each of two axes, is provided to scan the face of the oscilloscope. The oscilloscope presents a display in which the maxima and minima in the signature are highlighted, i.e., brighter in light intensity than the other portions of the signature. Such highlights may be established as well known systems wherein an operator viewing the signature manually utilizes electrodes to touch the face of the oscilloscope, thereby producing the high intensity points P1-P4 and Q1-Q2, using a graphics unit with strobe.

A Y-axis sensor bar 510 is mounted on a follower 511 on a screw 512. Screw 512 is driven by a motor 513. By this means the sensor bar 510 moves laterally across the field of the oscilloscope 505 to sense the bright points P1-P4 and Q1-Q2. A second sensor bar 515 is mounted on a follower 516 on a screw 517. Screw 517 is driven by a motor 518 so that the sensor bar 515 will provide an output each time one of the points P1-P4 and Q1-Q2 are encountered in a vertical sweep of oscilloscope 505, which cyclically occurs once for each zone.

Sensor bars 510 and 515 are connected by way of conductors 520 and 521 to the input of an AND gate 522, the output of which is connected to an input of an OR gate 523. The motor 513 drives an encoder 524, the output of which is passed through OR gate 523. If the field on the oscilloscope 505 is divided into ten uniform subareas, then the encoder 524 will apply a pulse to a data channel 525 every time the follower 511 moves from one zone to another.

In contrast, the motor 518 drives an encoder 530 that encodes the vertical position of the sensor bar 515 in a fairly fine scale. The code representing the vertical position at any time appears on a data channel 531. Channel 531 is connected by way of a switch 532 to the data input of a prototype storage unit 533. In its second position, the switch 532 applies the data on channel 531 to a first input of an unknown storage unit 534, a multi-bit shift register.

The output of unit 503 appearing on a data channel 535 is applied by way of a switch 536 to an input of a storage unit 537. In its second position, switch 536 applies the data on channel 535 to the input of a storage unit 538.

The output of OR gate 523 clocks the storage units 533, 534, 537 and 538 each time there is coincidence between the outputs of sensor bars 510 and 515, and each time the encoder 524 moves from one zone to another. The data on channels 531 and 535 thereby is stored in the storage units. More particularly, the magnitude of the displacement of the points P1-P4 and Q1-Q2 from a given reference is stored unit 533 or unit 534, and the curvature of the signature about each of the points is stored in unit 537 or unit 538.

In operation, a signature to be entered into a storage memory is displayed on oscilloscope 505 and sensed by unit 502. The resultant data is then stored in the prototype storage units 533 and 537. A plurality of such signatures from different makers can thus be stored in a memory bank represented by the prototype storage units 533 and 537. Thereafter, unknown signatures can be entered into the system in the same manner with the data representing the unknown signature being stored in the unknown storage units 534 and 538. Units 534 and 538 are temporary storage units that will be utilized repeatedly for each unknown signature that is to be tested against data in the prototype storage units 533 and 537.

In comparing the data is units 533 and 537 with the data in the unknown storage units 534 and 538, the outputs of the storage units are selected by way of a switch unit 540 having selectors 541 and 542. The Y-coordinate for the point P1 first is checked by applying the respective coordinates to a subtraction unit 543. The difference between the Y-location of the point P1 as stored in the prototype storage unit 533 and the Y-location as stored in the unknown storage 534 then is applied to a summation unit 544. Each of the points representing the Y-position of a highlighted point in the display of oscilloscope 505 will thus be sampled and tested, and the differences entered in the summation unit 544. In a similar manner, the code representing the curvatures as stored in units 537 and 538 are sampled and the differences entered in the summation unit 544.

A threshold level represented by a code stored in a threshold unit 545 is applied to a comparator 546. If the summation in unit 544 is within a predetermined limit of the threshold code stored in unit 545, then an indicator 547 will be actuated to indicate that the feature set of a signature on the document 500 corresponds with a signature feature set stored in the prototype storage units 533 and 537. Thus, the system of FIG. 13 represents a simplified system in which the extremes outside of the principal body envelope of the signature elements are sensed, stored and then compared with features of a prototype signature.

In accordance with the invention, there is provided an automated signature verification system for detecting invalid handwritten signatures in a stream of endorsed documents. Since the efficiency of the system is not dependent upon time related information, signature verification may be performed at a time remote from the instant of signing.

More particularly, plural samples of an authorized signature are scanned, and the binary images thereof processed to detect features descriptive of the distinctive geometrical characteristics of the signature. Feature vector sets representative of an upper zone, a lower zone and an ending of plural authorized signatures of an author are collected into upper zone, lower zone and signature ending clusters. A single prototype vector set is derived from each cluster, and weights and a decision threshold are assigned to each prototype vector set to form a reference data set.

When an unauthenticated signature is to be verified, the signature is scanned, and feature vector sets representative of the upper zone, the lower zone and the ending of the signature are formed as for the authorized signatures. Weighted sums of differences between the feature vector sets of the unauthenticated signature and the reference prototype vector sets of the authorized signatures then are compared with the respective decision thresholds for the upper zone, lower zone ad ending of the unauthenticated signature. If each weighted sum is less than or equal to the corresponding threshold, a valid signature is indicated. Otherwise, an invalid signature is indicated.

It will be seen that the generation of the feature vector set comprises detecting the coordinates in a two-dimensional array of the upper and lower peaks and signature ending. While the feature vector set as above described orders the elements in dependence upon position in the signature, it will be appreciated that they may be ordered in sequence of rank with position being a dependent variable. In either case, however, the shape parameter is a dependent variable. The analysis for shape is well known and may be carried out in accordance with the system and procedure described in patent 3,766,520, the same being incorporated herein by reference. Recognizing that in that system curvature, sharpness and stroke presence and direction are signified for each of a plurality of zones occupied by character protion.

Further, U.S. Pat. No. 3,541,511 to Genchi discloses a method and system now well known for automatic sensing of patterns in alphanumeric data and the same is incorporated herein by reference.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A method of identifying an authorized signature, which comprises:
    a. optically electrical images representative of multiple authorized signatures;
    b. scanning said electrical images to locate signature peaks in said authorized signatures;
    c. forming feature sets representative of said authorized signatures;
    d. forming from said feature sets a composite feature set;
    e. assigning weights to said composite feature set;
    f. forming a decision threshold from said weights and said composite feature set;
    g. collecting said decision threshold, said weights and said composite feature set to form a reference data set;
    h. repeating steps (a) through (c) for an unauthenticated signature; and
    i. comparing said reference data set with feature sets of said unauthenticated signature.

2. A method of identifying an authorized signature, which comprises:
    a. generating electrical images for plural authorized signatures of an author;
    b. scanning said electrical images to locate signature peaks in an upper zone and a lower zone of said authorized signatures and to detect an ending in said authorized signatures;
    c. forming feature vector sets representative of said upper zone, said lower zone and said ending of said authorized signatures;
    d. normalizing said feature vector sets to a minimum vector length;
    e. collecting said feature vector sets into vector clusters representative of said upper zone, said lower zone and said ending;
    f. forming from said vector clusters prototype vector sets including an upper zone prototype vector set, a lower zone prototype vector set and a signature ending prototype vector set;
    g. assigning weights to said prototype vector sets, said weights having values dependent upon said vector clusters;
    h. forming decision thresholds including an upper zone threshold, a lower zone threshold and a signature ending threshold from said weights, said prototype vector sets and said vector clusters;
    i. forming a reference data set including an upper zone subset, a lower zone subset and a signature ending subset from saud decision thresholds, said weights and said prototype vector sets;
    j. repeating steps (a) through (c) for an unauthenticated signature; and
    k. comparing said reference data set with feature vector sets of said unauthenticated signature.

3. The method set forth in claim 2, wherein the step of scanning said electrical images includes the steps:
    a. horizontally scanning said electrical images to detect the number of character segments, the length of said character segments and the space between said character segments in each horizontal scan;
    b. locating a signature base line, an upper boundary for non-capital characters, and an uppermost boundary and a lowermost boundary of said authorized signatures;
    c. vertically scanning said electrical image to detect a leftmost boundary and a rightmost boundary of said authorized signatures, and leftmost and rightmost boundaries of words comprising said authorized signatures; and
    d. locating said signature peaks between word boundaries.

4. The method set forth in claim 3, wherein the step of forming feature vector sets includes the steps:
    a. horizontally scanning said electrical images within domains about said signature peaks to detect the number of said character segments and the leftmost segment boundary and the rightmost segment boundary in each horizontal scan;
    b. comparing the geometry of detected ones of said character segments with upper zone and lower zone reference patterns to identify shapes of said authorized signatures about said signature peaks; and
    c. vertically scanning said electrical images leftward from said rightmost boundary to detect said ending, and identifying a geometrical shape of said ending.

5. The method set forth in claim 4, wherein each member of each of said feature vector sets representative of said upper zone and said lower zone is comprised of a normalized horizontal distance of one of said signature peaks from said leftmost boundary, a rank of said one of said signature peaks with respect to the vertical distance from said signature base line and a first code representative of one of said shapes.

6. The method set forth in claim 4, wherein each member of each of said feature vector sets representative of said ending is comprised of an indication of the presence of said ending and a second code representative of said geometrical shape.

7. The method set forth in claim 2, wherein the step of normalizing said feature vector sets includes the steps:
    a. scanning said feature vector sets to detect said minimum vector length; and
    b. removing selected set members from non-minimum length feature vector sets.

8. The method set forth in claim 7, wherein the step of removing selected set members includes the steps:
    a. comparing a first signature peak position of a minimum length feature vector set with a corresponding second signature peak position of one of said non-minimum length feature vector sets;
    b. if the absolute difference between said first and said second signature peak positions is zero, retaining the set members associated with said second signature peak position and repeating step (a) with next successive signature peak positions;
    c. if the absolute difference between said first and said second signature peak positions is greater than one, deleting the set members associated with said second signature peak position and repeating step (a) with next successive signature peak positions;

d. if the absolute difference between said first and said second signature peak positions is equal to one, repeating steps (a) through (c) with a first rank of said minimum length feature vector set and a second rank of said one of said non-minimum length feature vector sets;

e. if the absolute difference between said first and said second ranks is equal to one, repeating steps (a) through (c) with a first shape of said minimum length feature vector set and a second shape of said one of said non-minimum length feature vector sets;

f. if the absolute difference between said first and said second shapes is equal to one, deleting the set members associated with said second shape; and g. repeating steps (a) through (f) for each of said non-minimum length feature vector sets.

9. The method set forth in claim 2, wherein the step of forming decision thresholds includes the step of satisfying a weighted sum equation, $$D_k = \sum_{i,j} \omega_{ij} |F_{ij} - PT_{ij}|,$$

where $k$ identifies said upper zone threshold, said lower zone threshold and said signature ending threshold, $\omega$ refers to said weights, F refers to said feature vector sets, PT refers to said prototype vector sets, and i and j refer to components of said feature vector sets and said prototype vector sets and the weights assigned thereto.

10. The method set forth in claim 9, wherein said step of comparing said reference data set with feature vector sets of said unauthenticated signature includes the steps:

a. selecting said upper zone prototype vector set and counting a number of said weights assigned to said upper zone prototype vector set and having a reference value;

b. detecting a total number of said weights assigned to said upper zone prototype vector set, and indicating an indeterminate signature if said number exceeds a percentage of said total number;

c. if said number does not exceed said percentage, satisfying said weighted sum equation and issuing an invalid signature signal if an upper zone weighted sum exceeds said upper zone threshold;

d. if said upper zone weighted sum does not exceed said upper zone threshold, satisfying said weighted sum equation for a lower zone weighted sum and issuing said invalid signature signal if said lower zone weighted sum exceeds said lower zone threshold;

e. if said lower zone weighted sum does not exceed said lower zone threshold, satisfying said weighted sum equation for a signature ending weighted sum and issuing an invalid signature signal if said signature ending weighted sum exceeds said signature ending threshold; and f. issuing a valid signature signal if said signature ending weighted sum does not exceed said signature ending threshold.

11. a signature verification system for verifying authentic signatures and detecting invalid signatures at a time remote from the instant of signing, which comprises:

a. optical signature scan means for generating binary images of signatures;

b. feature detecting means receiving said binary images for detecting peaks in said signatures and identifying the shape of said signatures about said peaks;

c. set generating means responsive to said feature detecting means for generating feature sets representative of said signatures;

d. set compression means operating upon those of said feature sets representative of authorized ones of said signatures for forming a composite feature set for each of said authorized ones;

e. decision control means in electrical communication with said set compression means for providing a decision threshold and assigning a weight to each said composite feature set to form a reference data set;

f. data storage means receiving the outputs of said set compression means and said decision control means for storing said reference data set; and g. verification means in electrical communication with said data storage means and said set generating means for comparing said decision threshold with a weighted sum of differences between said composite feature set and those of said feature sets representative of unauthenticated ones of said signatures.

12. A signature verification system for verifying authentic signatures and detecting invalid signatures at a time remote from the instant of signing, which comprises:

a. signature scan means for generating binary images of signatures;

b. features detecting means receiving said binary images for detecting uppermost and lowermost peaks and a signature ending in each of said signatures and identifying the shape of said signatures about said peaks;

c. vector generating means responsive to said feature detecting means for generating feature vector sets representative of an upper zone, a lower zone and said signature ending of each of said signatures;

d. vector compression means operating upon those of said feature vector sets representative of authorized ones of said signatures for forming prototype vector sets including a upper zone prototype vector set, a lower zone prototype vector set and a signature ending prototype vector set;

e. decision control means in electrical communication with said vector compression means for providing a decision threshold for each of said prototype vector sets and assigning a weight to each component of each of said prototype vector sets to form a reference data set;

f. data storage means receiving the outputs of said vector compression means and said decision control means for storing said reference data set; and g. verification means in electrical communication with said data storage means and said vector generating means for comparing each said decision threshold with weighted sums of differences between each of said prototype vector sets and respective ones of said feature vector sets representative of unauthenticated ones of said signatures.

13. The combination set forth in claim 12, wherein said feature detecting means comprises;

a. row scan means for horizontally scanning said binary images to detect horizontal features of said signatures;

b. column scan means responsive to said row scan means for vertically scanning said binary images to detect the horizontal boundaries of said signatures and of words comprising said signatures;

c. block detecting means receiving the output of said column scan means for detecting said peaks of said signatures;

d. end detecting means in electrical communication with said row scan means and said column scan means for signalling the occurrence of each said signature ending; and e. pattern recognition means responsive to said row scan means, said block detecting means and said end detecting means for identifying the shape of said signatures in near proximity to said peaks, and the shape of each said signature ending.

14. The combination set forth in claim 12, wherein said vector cmpression means comprises:

a. vector length detecting means for detecting a minimum vector length of selected ones of said feature vector sets representative of said authorized ones of said signatures;

b. vector normalization means responsive to said vector length detecting means for reducing the vector length of said selected ones of said feature vector sets to said minimum vector length;

c. vector collecting means receiving normalized feature vector sets from said vector normalization means for grouping said normalized feature vector sets into three clusters representative of each said upper zone, each said lower zone and each said signature ending of said authorized ones of said signatures; and d. prototype generating means operating upon each of said normalized feature vector sets for forming said prototype vector sets from said three clusters.

15. The combination set forth in claim 14, wherein said decision control means includes:

a. weight generating means in electrical communication with said vector collecting means and said prototype generating means for assigning weights to each of said prototype vector sets; and b. threshold generating means connected to the outputs of said vector collecting means, said prototype generating means and said weight generating means for providing decision thresholds for each of said prototype vector sets.

16. An automated signature verification system, which comprises:

a. logic control means for controlling the operation of said signature verification system;

b. video data lift means responsive to said logic control means for generating binary images of signatures;

c. circulating memory means responsive to said logic control means and in electrical communication with said video data lift means for storing said binary images in scan period increments;

d. row analyzing means receiving binary data from said circulating memory means and responsive to said logic control means for detecting horizontal features of said signatures;

e. column analyzing means responsive to said logic control means and in electrical communication with said row analyzing means and said circulating memory means for locating the horizontal boundaries of said signatures and of words within said signatures;

f. peak detecting means responsive to said logic control means and in electrical communication with said column analyzing means and said circulating memory means for locating uppermost peaks and lowermost peaks of said signatures;

g. end detecting means responsive to said logic control means and in electrical communication with said row analyzing means, said column analyzing means and said circulating memory means for indicating the presence of signature endings;

h. zone pattern recognition means in electrical communication with said peak detecting means, said row analyzing means, said circulating memory means and said logic control means for identifying the shapes of said signatures about said uppermost peaks and said lowermost peaks;

i. end pattern recognition means in electrical communication with said end detecting means and said circulating memory means for identifying the shapes of said signature endings;

j. feature vector generator means responsive to said logic control means and in electrical communication with said circulating memory means, said column analyzing means, said peak detecting means, said end detecting means, said zone pattern recognition means and said end pattern recognition means for generating feature vector sets representative of an upper zone, a lower zone and an ending of said signatures;

k. vector compression means operating upon those of said feature vector sets representative of authorized ones of said signatures for forming a prototype vector set for each of said upper zone, said lower zone and said ending;

l. parametric generator means responsive to said logic control means and in electrical communication with said vector compression means for providing a decision threshold and a weighting for each said prototype vector set to form a reference data set;

m. reference memory means responsive to said memory control means for storing said reference data set; and n. vector comparator means responsive to said logic control means and in electrical communication with said feature vector generator means and said reference memory means for indicating the validity or invalidity of unauthenticated ones of said signatures.

* * * * *